United States Patent
Belongie et al.

[11] Patent Number: 6,097,035
[45] Date of Patent: Aug. 1, 2000

[54] FINGERPRINT DETECTION APPARATUS WITH PARTIAL FINGERPRINT IMAGES

[75] Inventors: Serge J. Belongie, Berkeley; Vance C. Bjorn, Palo Alto, both of Calif.

[73] Assignee: Digital Persona, Inc., Redwood City, Calif.

[21] Appl. No.: 09/255,037

[22] Filed: Feb. 22, 1999

[51] Int. Cl.[7] .................................................. G06K 5/00
[52] U.S. Cl. ............................ 250/556; 356/71; 382/124
[58] Field of Search ................................ 250/556, 208.1, 250/559.4; 356/71; 382/124, 115, 126, 182, 181

[56] References Cited

U.S. PATENT DOCUMENTS

| | | | |
|---|---|---|---|
| 3,419,287 | 12/1968 | Rudie | 283/7 |
| 3,872,438 | 3/1975 | Cuttill et al. | 340/149 A |
| 3,959,884 | 6/1976 | Jordan et al. | 340/146.3 |
| 4,047,154 | 9/1977 | Vitols et al. | 340/146.3 |
| 4,151,512 | 4/1979 | Riganati et al. | 340/146.3 |
| 4,156,230 | 5/1979 | Riganati et al. | 340/146.3 |
| 4,185,270 | 1/1980 | Fischer et al. | 340/146.3 |
| 4,208,651 | 6/1980 | McMahon | 340/146.3 |
| 4,210,899 | 7/1980 | Swonger et al. | 340/146.3 |
| 4,225,850 | 9/1980 | Chang et al. | 340/146.3 |
| 4,253,086 | 2/1981 | Szwarcbier | 340/146.3 |
| 4,260,979 | 4/1981 | Smith | 340/146.3 |
| 4,414,684 | 11/1983 | Blonder | 382/4 |
| 4,449,189 | 5/1984 | Feix et al. | 364/513.5 |
| 4,454,610 | 6/1984 | Sziklai | 382/3 |
| 4,525,859 | 7/1985 | Bowles et al. | 382/5 |
| 4,581,760 | 4/1986 | Schiller et al. | 382/4 |
| 4,607,384 | 8/1986 | Brooks | 382/4 |
| 4,618,988 | 10/1986 | Schiller | 382/5 |
| 4,636,622 | 1/1987 | Clark | 235/380 |
| 4,641,350 | 2/1987 | Bunn | 382/4 |
| 4,646,352 | 2/1987 | Asai et al. | 382/5 |
| 4,685,145 | 8/1987 | Schiller | 382/52 |
| 4,696,046 | 9/1987 | Schiller | 382/5 |
| 4,698,751 | 10/1987 | Parvin | 364/200 |
| 4,723,298 | 2/1988 | Schiller | 382/56 |
| 4,747,147 | 5/1988 | Sparrow | 382/4 |
| 4,752,966 | 6/1988 | Schiller | 382/5 |
| 4,777,651 | 10/1988 | McCann et al. | 382/21 |
| 4,787,742 | 11/1988 | Schiller et al. | 356/71 |
| 4,790,564 | 12/1988 | Larcher et al. | 283/69 |
| 4,805,223 | 2/1989 | Denyer | 382/4 |
| 4,811,414 | 3/1989 | Fishbine et al. | 382/52 |
| 4,817,183 | 3/1989 | Sparrow | 382/4 |
| 4,827,527 | 5/1989 | Morita et al. | 382/4 |
| 4,837,843 | 6/1989 | Owechko | 382/31 |
| 4,876,726 | 10/1989 | Capello et al. | 382/4 |
| 4,891,503 | 1/1990 | Jewell | 235/380 |
| 4,896,363 | 1/1990 | Taylor et al. | 382/5 |
| 4,907,156 | 3/1990 | Doi et al. | 364/413.13 |
| 4,933,976 | 6/1990 | Fishbine et al. | 382/4 |
| 4,944,021 | 7/1990 | Hoshino et al. | 382/5 |

(List continued on next page.)

FOREIGN PATENT DOCUMENTS

| | | |
|---|---|---|
| 0159037 | 10/1985 | European Pat. Off. . |
| 4125198 | 5/1992 | Germany . |
| 5-89324 | 8/1993 | Japan . |
| 1283748 | 8/1972 | United Kingdom . |
| 8203286 | 9/1982 | WIPO . |
| 9107728 | 5/1998 | WIPO . |

*Primary Examiner*—Que T. Le
*Attorney, Agent, or Firm*—Blakely, Sokoloff, Taylor & Zafman LLP

[57] ABSTRACT

A fingerprint detection apparatus which includes a detection array having a detection surface, and a fingerprint platform configured to supply a plurality of partial fingerprint images of a fingerprint to the detection surface as the fingerprint is moved relative to the detection surface. The fingerprint detection apparatus also includes a processing device that is configured to construct a final fingerprint image from the plurality of partial fingerprint images supplied to the detection surface. A method of detecting a fingerprint image comprising the steps of: (1) supplying a plurality of partial fingerprint images of a fingerprint to a detection surface of a detection array as the fingerprint is moved relative to the detection surface; and (2) constructing a final fingerprint image from the plurality of partial fingerprint images.

40 Claims, 15 Drawing Sheets

U.S. PATENT DOCUMENTS

| | | | |
|---|---|---|---|
| 4,947,442 | 8/1990 | Tanaka et al. | 382/5 |
| 4,947,443 | 8/1990 | Costello | 382/5 |
| 4,956,870 | 9/1990 | Hara | 382/30 |
| 4,993,068 | 2/1991 | Piosenka et al. | 380/23 |
| 4,995,086 | 2/1991 | Lilley et al. | 382/4 |
| 5,040,223 | 8/1991 | Kamiya et al. | 382/4 |
| 5,040,224 | 8/1991 | Hara | 382/4 |
| 5,050,220 | 9/1991 | Marsh et al. | 382/4 |
| 5,050,222 | 9/1991 | Lee | 382/21 |
| 5,053,608 | 10/1991 | Senanayake | 235/380 |
| 5,054,090 | 10/1991 | Knight et al. | 382/4 |
| 5,067,162 | 11/1991 | Driscoll, Jr. et al. | 382/5 |
| 5,095,194 | 3/1992 | Barbanell | 235/379 |
| 5,101,436 | 3/1992 | DeAguiar et al. | 382/1 |
| 5,105,467 | 4/1992 | Kim et al. | 382/4 |
| 5,109,428 | 4/1992 | Igaki et al. | 382/5 |
| 5,144,680 | 9/1992 | Kobayashi et al. | 382/4 |
| 5,151,945 | 9/1992 | Lee et al. | 382/1 |
| 5,175,593 | 12/1992 | Kumagai et al. | 356/71 |
| 5,187,747 | 2/1993 | Capello et al. | 382/4 |
| 5,187,748 | 2/1993 | Lee | 382/4 |
| 5,222,152 | 6/1993 | Fishbine et al. | 382/2 |
| 5,222,153 | 6/1993 | Beiswenger | 382/4 |
| 5,239,590 | 8/1993 | Yamamoto | 382/4 |
| 5,402,324 | 3/1995 | Yokoyama et al. | 362/19 |
| 5,416,573 | 5/1995 | Sartor, Jr. | 356/71 |
| 5,448,649 | 9/1995 | Chen et al. | 382/126 |
| 5,448,659 | 9/1995 | Tsutsui et al. | 385/14 |
| 5,467,403 | 11/1995 | Fishbine et al. | 382/116 |
| 5,493,621 | 2/1996 | Matsumura | 382/125 |
| 5,509,083 | 4/1996 | Abtahi et al. | 382/124 |
| 5,513,272 | 4/1996 | Bogosian, Jr. | 382/116 |
| 5,522,623 | 6/1996 | Soules et al. | 283/91 |
| 5,524,069 | 6/1996 | Inoue | 382/270 |
| 5,524,161 | 6/1996 | Omori et al. | 382/125 |
| 5,530,757 | 6/1996 | Krawczyk | 380/23 |
| 5,541,994 | 7/1996 | Tomko et al. | 380/30 |
| 5,563,345 | 10/1996 | Kersten et al. | 73/602 |
| 5,572,597 | 11/1996 | Chang et al. | 382/125 |
| 5,613,012 | 3/1997 | Hoffman et al. | 382/115 |
| 5,619,586 | 4/1997 | Sibbald | 382/127 |
| 5,623,552 | 4/1997 | Lane | 382/124 |
| 5,625,448 | 4/1997 | Ranalli et al. | 356/71 |
| 5,644,645 | 7/1997 | Osuga | 382/124 |
| 5,650,842 | 7/1997 | Maase et al. | 356/71 |
| 5,668,603 | 9/1997 | Copeland | 348/473 |
| 5,680,205 | 10/1997 | Borza | 356/71 |

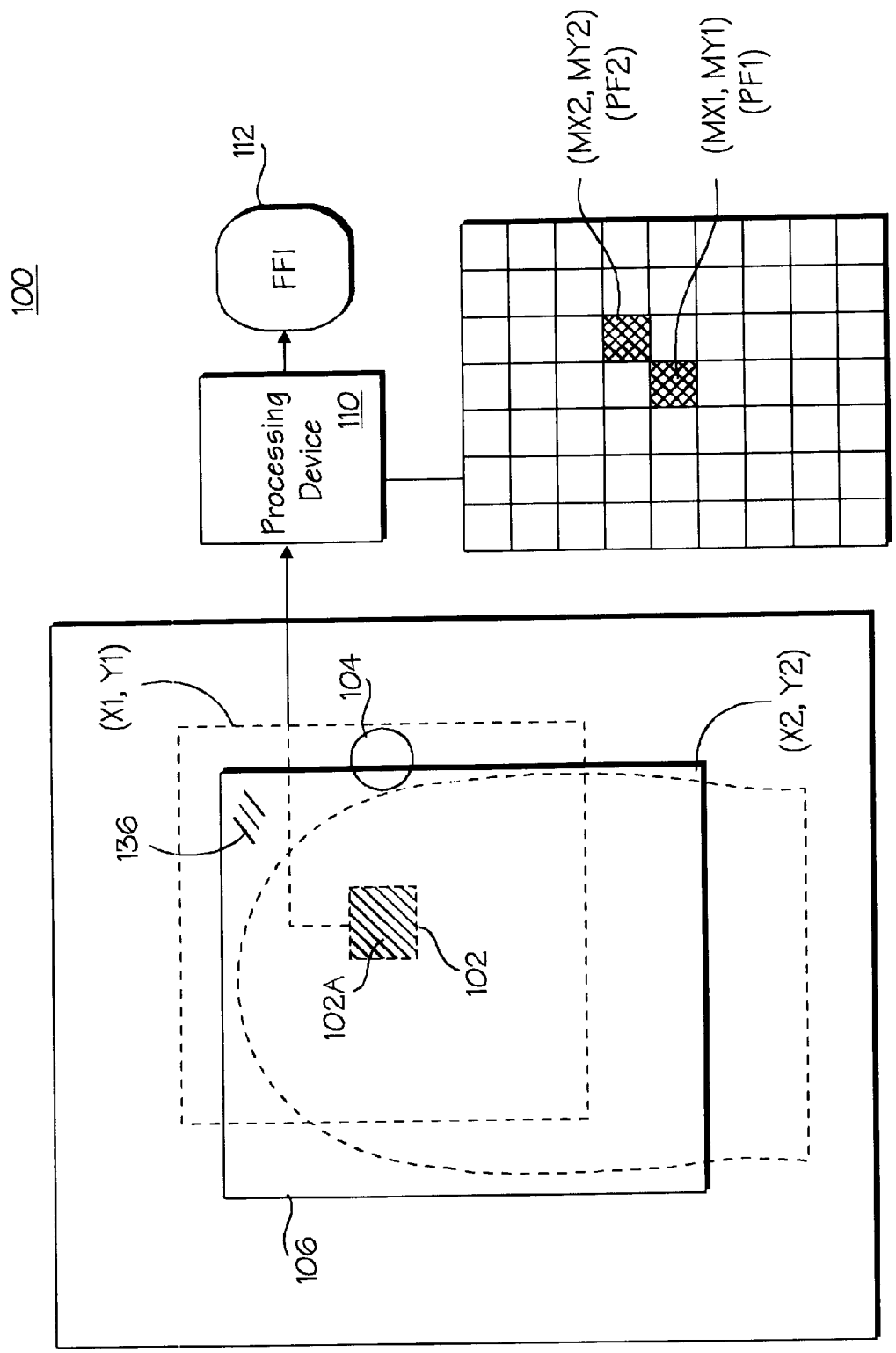

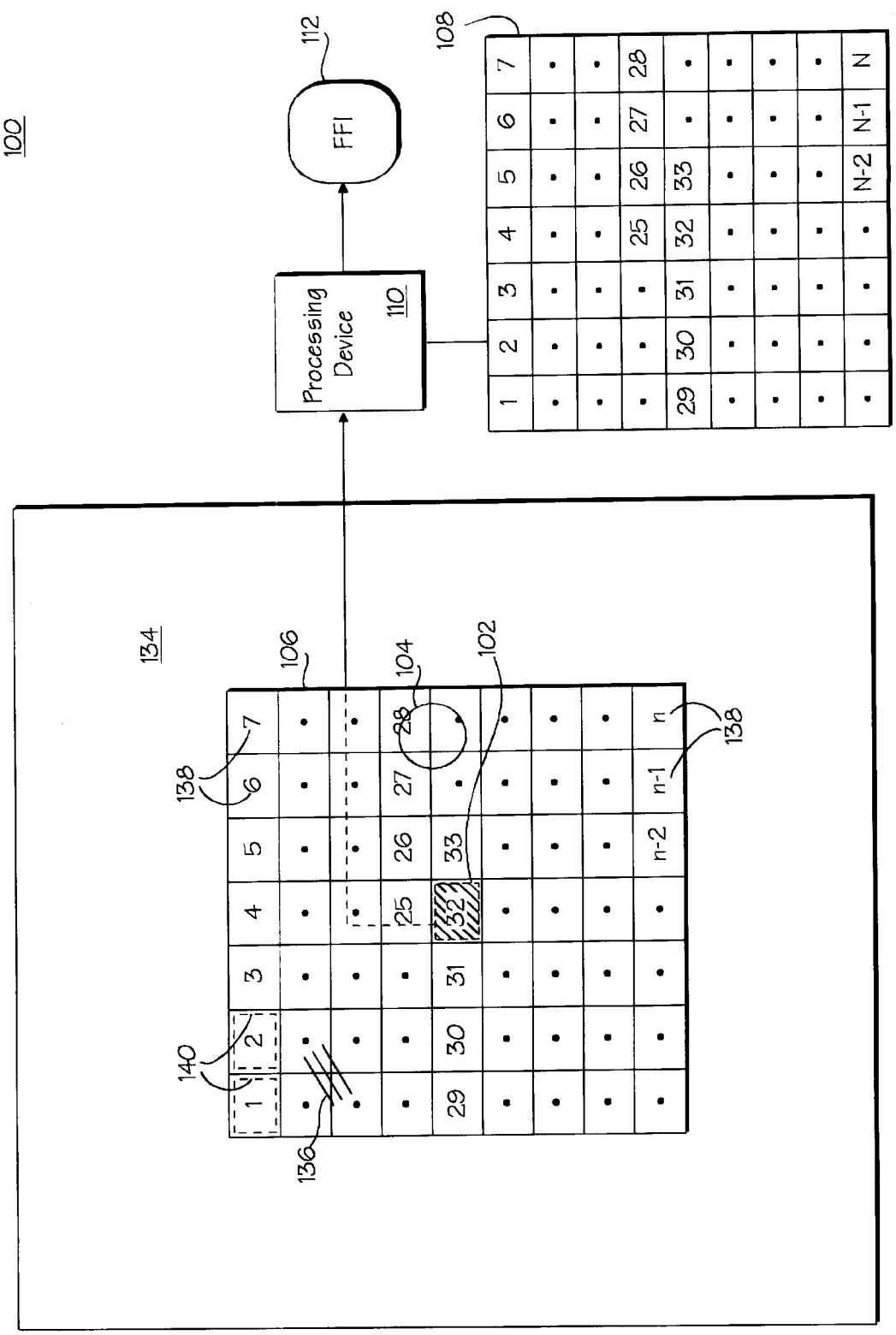

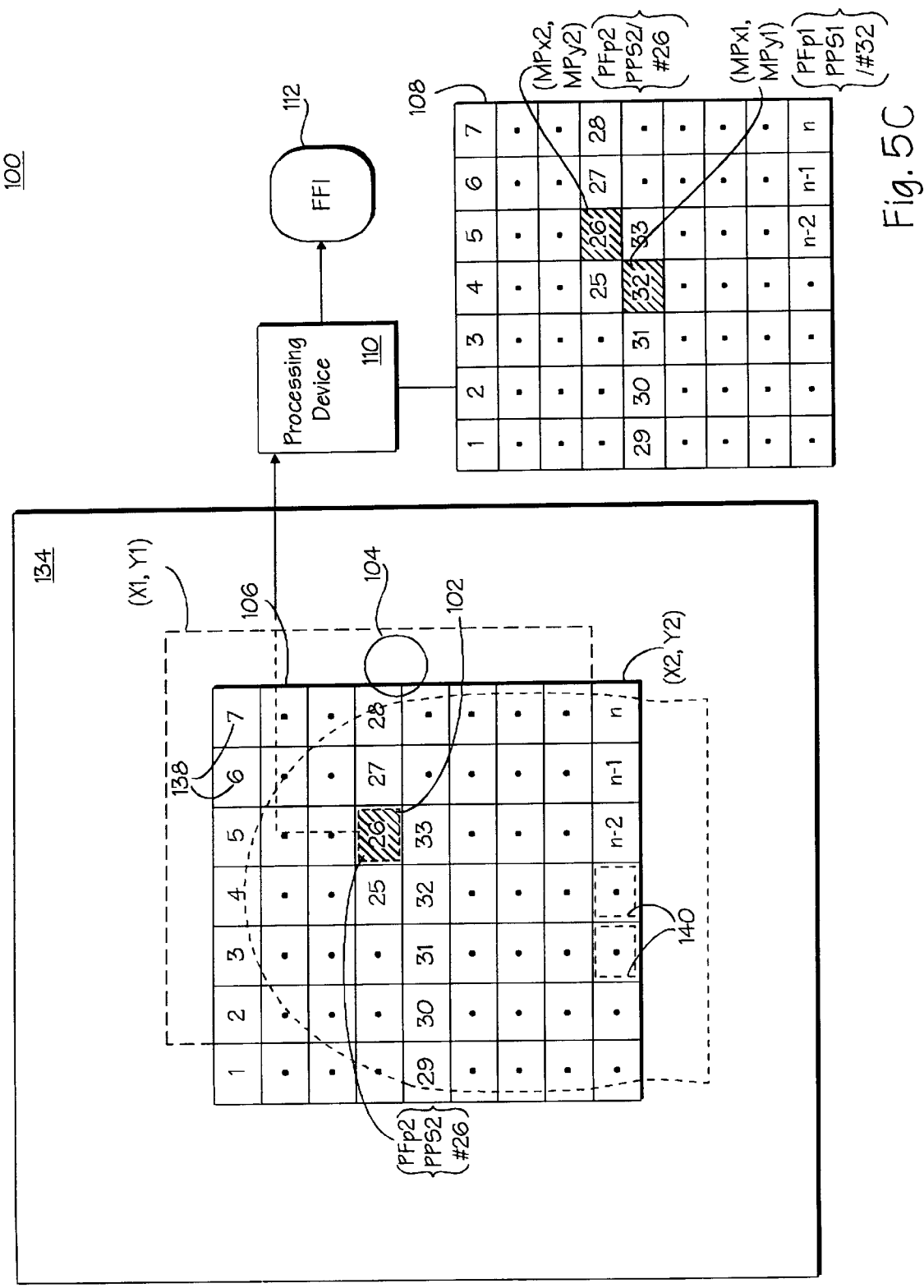

FINGERPRINT DETECTION APPARATUS WITH PARTIAL FINGERPRINT IMAGES

FIELD OF THE INVENTION

The present invention relates to fingerprint recognition. More specifically, the present invention relates to a method and apparatus for generating and detecting fingerprint images from a series of partial fingerprint images using a detection array having a reduced detection area.

BACKGROUND

Presently, electronic transactions are becoming more common and widespread as we enter the electronic age. Typically, electronic transactions utilize a variety of security measures which provide for the protection and security of those who conduct such transactions. Such security measures have included the usage of passwords, numerical identifiers, magnetic stripe access cards with PIN identifiers, and the like. A vast majority of these security measures, however, typically require the memorization of words or numeric identifiers. As the number of different electronic transactions increase, the amount of information which needs to be memorized increases proportionately, which results in an unmanageable amount of information that needs to be memorized or otherwise retained.

In response to this problem, fingerprint recognition systems have been developed in order to provide security and protection for those who conduct such transactions. Fingerprint recognition systems utilizes each individuals unique fingerprint image as an identifier or password for gaining access to different secure systems (e.g., secure computer systems, bank ATM's, alarmed entry systems). Since each fingerprint image is unique to each individual, fingerprint recognition systems may be employed for a variety of systems which require an unique identifier to be associated with an individual or transaction.

One reason that fingerprint recognition systems have not been implemented on a wide scale, as of yet, is due in part to the costs associated with the detection arrays employed in fingerprint recognition systems. Detection arrays, which are commonly referred to as charge-coupled devices, are comprised of a series of light-sensitive photocells, which can be used to construct cameras or images scanners on the surface of a CCD chip. Each CCD chip, however, is typically expensive due to the relative complexity of fabricating such a chip to perform a scanning function. As the size of a CCD chip increases, the cost of the CCD chip increases due to the proportional increase in the number of photocells required on the detection surface of the CCD chip.

Typically, a large CCD chip is employed to support fingerprint detection in a standard fingerprint recognition system, as current fingerprint recognition systems typically require a large CCD chip to accommodate an entire reflected fingerprint image on the detection surface of the CCD chip. As is known, detection arrays vary greatly in price relative to the detection surface. Therefore, as the detection surface of a detection array increases in area, the price, even in relation to a relatively small change in area, can vary dramatically. As a result, currently available fingerprint detection systems are quite costly, due in part for the need of having a large CCD chip to accommodate the entire reflected fingerprint image.

It is therefore desirable to provide a fingerprint detection system which utilizes a relatively smaller CCD chip, as compared to currently utilized detection arrays, thereby greatly reducing the cost associated with the detection array and resulting in an overall lower cost fingerprint detection system.

SUMMARY OF THE INVENTION

A fingerprint detection apparatus which includes a detection array having a detection surface, and a fingerprint platform configured to supply a plurality of partial fingerprint images of a fingerprint to the detection surface as the fingerprint is moved relative to the detection surface. The fingerprint detection apparatus also includes a processing device that is configured to construct a final fingerprint image from the plurality of partial fingerprint images supplied to the detection surface.

A method of generating a fingerprint image comprising the steps of: (1) supplying a plurality of partial fingerprint images of a fingerprint to a detection surface of a detection array as the fingerprint is moved relative to the detection surface; and (2) constructing a final fingerprint image from the plurality of partial fingerprint images.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 illustrates an embodiment of fingerprint platform capable of implementing the teachings of the present invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Figure 1:
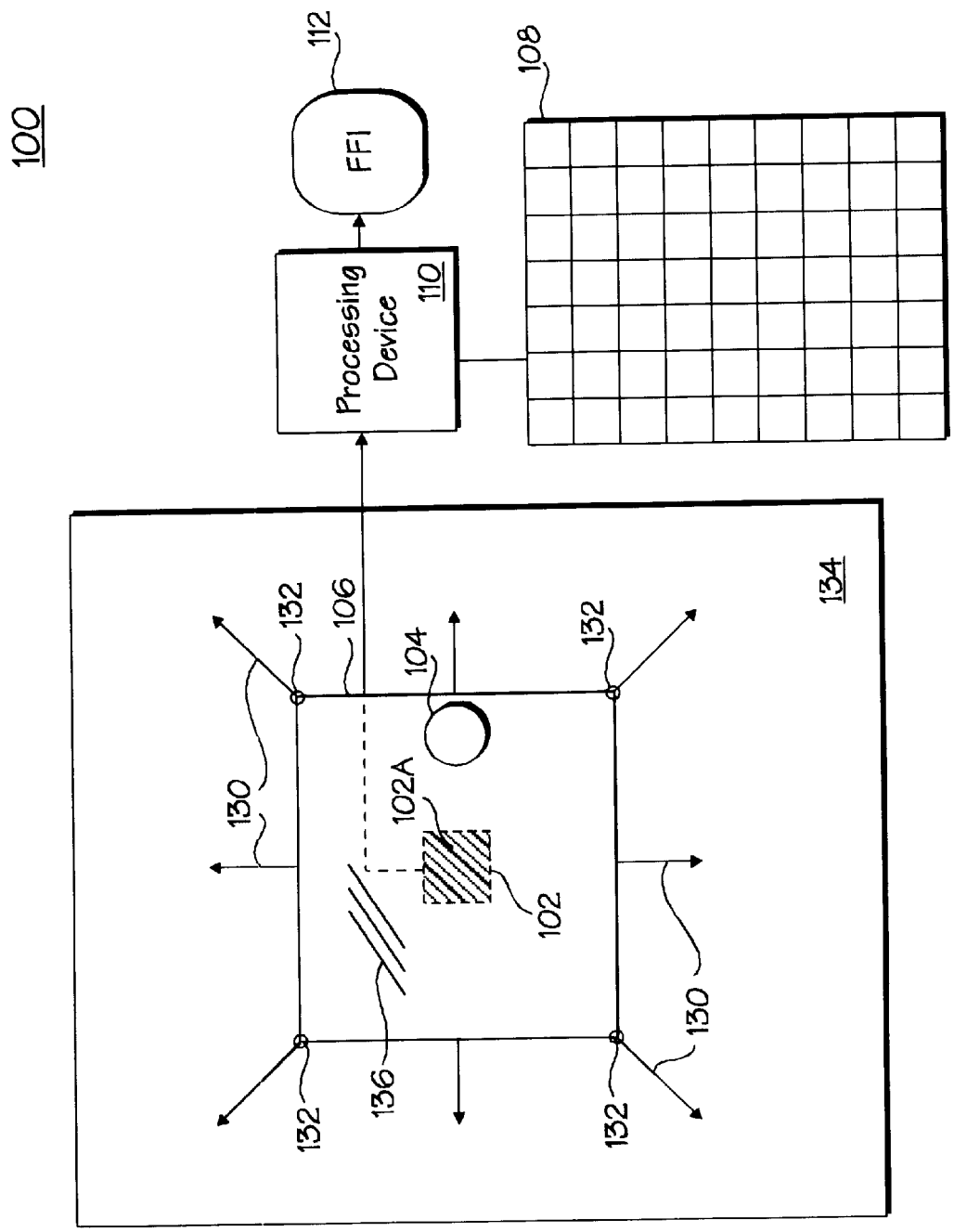
FIG. 1 illustrates an embodiment of a fingerprint detection device capable of implementing the teachings of the present invention.

FIG. 1 is a block diagram of an embodiment of a fingerprint detection device capable of implementing the teachings of the present invention. FIG. 1 illustrates an embodiment of a fingerprint detection device 100 comprising a detection array 102, an illumination source 104, a fingerprint sensing platform (fingerprint platform) 106, a memory device (e.g., RAM or other memory storage medium or device) 108, and a processing device 110. Also illustrated in FIG. 1, is an output 112 (i.e., Final Fingerprint Image) which is generated by the a fingerprint detection device 100. Each of the components of the fingerprint detection device 100 are selectively and operatively coupled to provide the functionality of the fingerprint detection device 100 as illustrated below.

The detection array 102, also referred to as a charge-coupled device (CCD chip), illustrated in the embodiment of FIG. 1, may utilize a semiconductor technology for producing light-sensitive devices, such as cameras or image scanners. Each detection array 102 may be comprised of an array of light-sensitive photocells, wherein each photocell is sensitized by giving the photocell an electrical charge prior to exposure.

In the embodiment of FIG. 1, the detection array 102 may be relatively smaller in size than the typical detection array currently employed in presently available fingerprint scanning devices. The detection array 102 contained in the fingerprint detection device 100 of FIG. 1 is configured to operate with a detection surface 102A of a reduced size or area, as compared to the detection surface area of the typical detection arrays currently used in available fingerprint scanning devices.

In FIG. 1, the detection array 102 is configured to receive a series of reflected partial fingerprint images which are used to fabricate or generate a final fingerprint image (FFI) 112. The final fingerprint image (FFI) 112 may be a partial or full representation of an entire fingerprint or fingerprint image. Accordingly, the final fingerprint image (FFI) 112 may be used for identification purposes (e.g., identification of an individual) in a related fingerprint comparison and identification device (not shown). The operation of the reduced size detection array 102 will be discussed, in further detail below, within the context of the fingerprint detection device 100.

As mentioned above, the fingerprint detection device 100 contains an illumination source 104, the illumination source 104 is used in conjunction with the fingerprint platform 106 and the detection array 102 for generating a series of partial fingerprint images which are supplied to the detection array 102. The partial fingerprint images are then supplied to the processing device 110 by the detection array 102. The processing device 110 may comprise, for example, a CPU (Central Processing Unit), a microprocessor device, or other processing device which is capable of interpreting data, executing instructions, and transferring information or data to and from other components within the fingerprint detection device 100. As such, the processing device 110 is configured to receive the partial fingerprint images, or data representing the partial fingerprint images, from the detection array 102 through the combined usage of the illumination source 104 and the fingerprint platform 106.

Figure 2A:
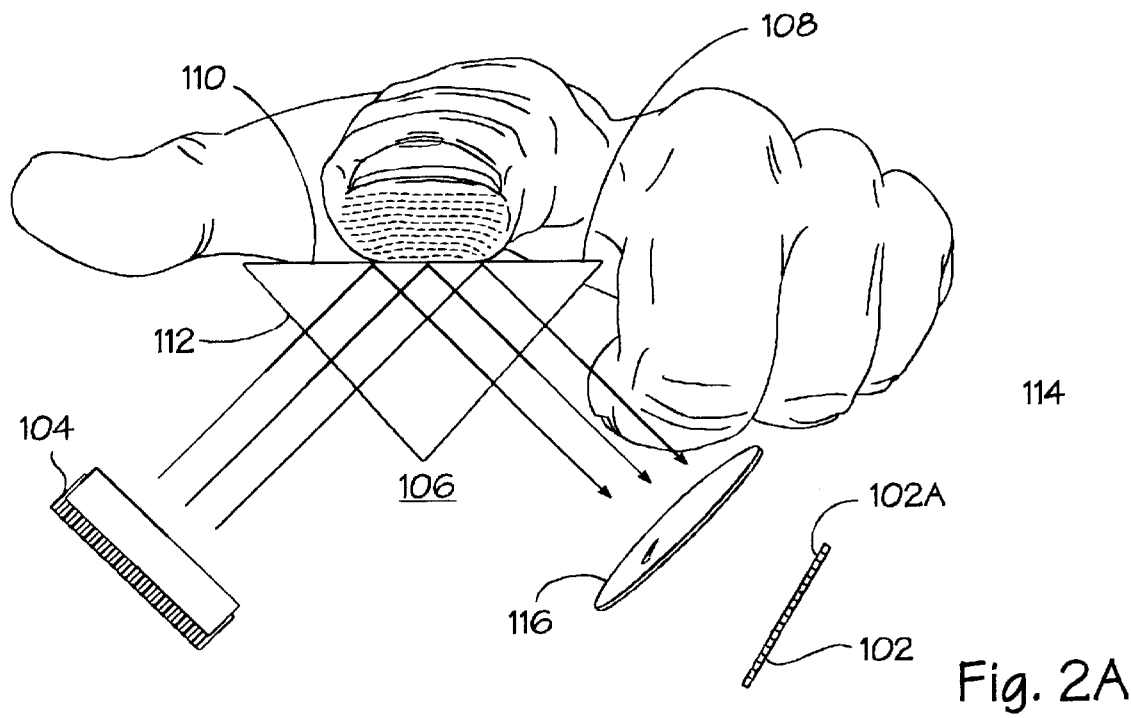
FIG. 2A illustrates an embodiment of a fingerprint platform for use in accordance with the teachings of the present invention.

In one embodiment of the fingerprint platform 106, as illustrated in FIG. 2A, the fingerprint platform 106 comprises a prism 108 which is used to reflect a series of partial fingerprint images to the detection surface 102A of the detection array 102. Initially, a fingertip or fingerprint is applied to the sensing surface 110 of the prism 108. Next, the illumination source 104 (e.g., light source) generates radiant energy which is directed at an entrance surface 112 of the prism 108, the radiant energy is directed to the detection surface 102A of the detection array 102. Where ridges on the finger are in contact with the sensing surface 110, the radiant energy will be transmitted into or absorbed by the finger. Alternately, the grooves of the fingerprint (fingertip), which do not make contact with the sensing surface 110, reflect the radiant energy from the sensing surface 110 toward the exit surface 114 of the prism 108. The reflected radiant energy exits via the exit surface 114 of the prism 108 and is directed to the detection surface 102A of the detection array 102, typically through an optional lens 116, wherein a reflected image of the partial fingerprint image is formed.

Figure 2B:
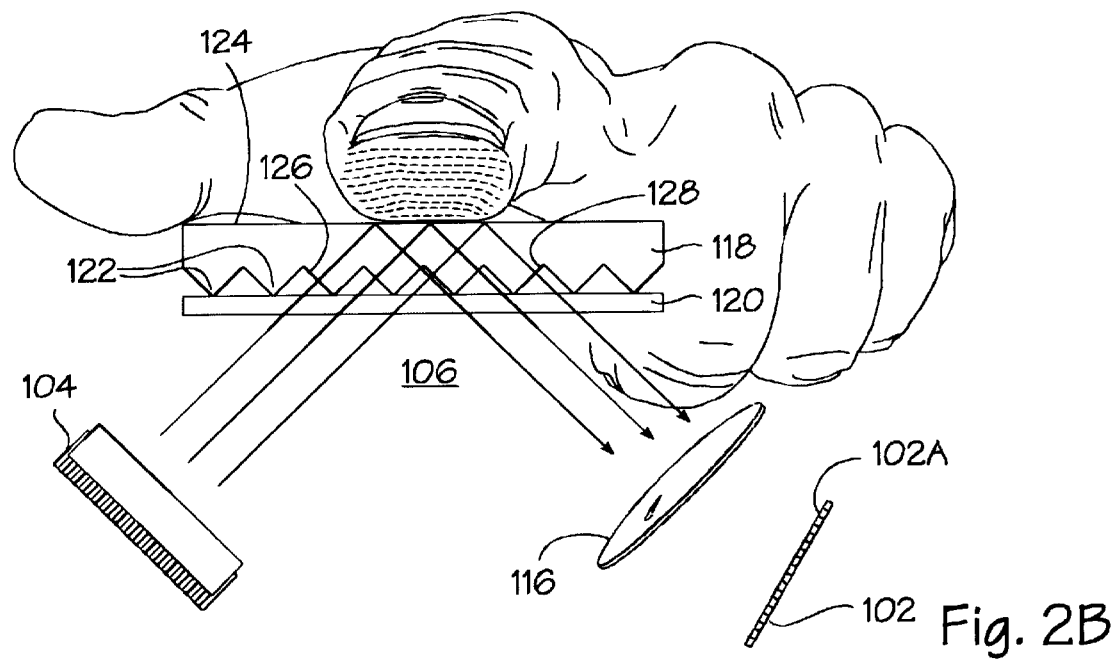
FIG. 2B illustrates an alternate embodiment of a fingerprint platform for use in accordance with the teachings of the present invention.

In another embodiment of the fingerprint platform 106, as illustrated in FIG. 2B, the fingerprint platform 106 comprises a sheet prism 118, which possesses a slim profile as compared to the prism profile of FIG. 2A. The sheet prism 118 may be disposed above or on a transparent support medium 120, wherein the sheet prism 118 is configured to slide or otherwise move with respect to the transparent support medium 120. The sheet prism 118 is typically utilized in applications which require a slim profile fingerprint platform, such as for example in laptop computer touch-pad devices. The fingerprint platform 106 of FIG. 2B comprises a series of prismlets 122 which are positioned opposite the sensing surface 124 of the sheet prism 118. Accordingly, each prismlet 122 has a corresponding entrance surface 126 and exit surface 128, each prismlet 122 being adjacent to another prismlet 122 within the sheet prism 118. Correspondingly, when a fingerprint image (i.e., finger) is placed on the sensing surface 124, a portion of the illumination radiation from the illumination source 104 enters the entrance surface 126 of the prismlets 122.

Similar to the fingerprint platform 106 of FIG. 2A, where ridges on the finger are in contact with the sensing surface 124 the radiant energy will be transmitted into or absorbed by the finger. Alternately, the grooves of the fingerprint (fingertip), which do not make contact with the sensing surface 124, reflect the radiant energy from the sensing surface 124 toward the respective exit surface 128 associated with each prismlet 122. The reflected radiant energy exits via the respective exit surfaces 128 of the prismlets 122 and is directed to the detection surface 102A of a detection array 102, typically through an optional lens 116, wherein a reflected image of the partial fingerprint image is formed.

Referring back to FIG. 1, the fingerprint platform 106 is configured to move relative to the detection surface 102A of the detection array 102. As such, the fingerprint platform 106 may be manipulated with respect to the detection surface 102A of the detection array 102, as illustrated by the movement arrows 130. The movement functionality of the fingerprint platform 106 may be implemented through a variety of devices 132 (e.g., sliding films, tracks rollers, roller-ball or roller assemblies), either alone or in combination, which allow for the fingerprint platform 106 to move relative to a stationary point. For example, a series of movable roller assemblies may be used, wherein the roller assemblies are configured to allow the fingerprint platform 106 to move relative to the detection surface 102A of the detection array 102. It is understood that the fingerprint platform 106 may be configured to move to the detection surface 102A of the detection array 102 by a variety of devices, and the aforementioned example is illustrative of one embodiment of a device which allows such movement and is not meant to limit the fingerprint detection device 100 to such implementation.

In one embodiment, the movement of the fingerprint platform 106 may be limited to a boundary area 134 which allows for a series of partial fingerprint images encompassing the entire fingerprint to be reflected onto the detection surface 102A of the detection array 102 as the fingerprint platform 106 is manipulated with respect to the detection surface 102A of the detection array 102.

As such, the fingerprint platform 106 may be manipulated in any direction with respect to the detection surface 102A of the detection array 102, as illustrated by the movement arrows 130. The fingerprint platform 106 may be moved by having an individual place their fingertip onto the sensing surface 136 of the fingerprint platform 106 and moving the fingerprint platform 106 relative to the detection surface 102A of the detection array 102. The sensing surface 136 of the fingerprint platform 106 is a transparent medium which allows reflected images (i.e., partial fingerprint images) of the fingerprint, which is placed on the sensing surface 136 of the fingerprint platform 106, to be reflected onto the detection surface 102A of the detection array 102.

In an alternate embodiment, the fingerprint platform 106 may have an associated pre-selected movement pattern which forces the user of the fingerprint detection device 100 to conform to a pre-selected movement pattern when moving the fingerprint platform 106. In yet another embodiment, the fingerprint platform 106 may be controlled by a motorized mechanism which moves the moves the fingerprint platform 106 along a pre-selected movement pattern. As such, the pre-selected movement pattern would enable the detection surface 102A of the detection array 102 to receive a pre-selected series of partial fingerprint images, corresponding to the pre-selected movement pattern, as the fingerprint platform 106 is moved relative to the detection surface 102A of the detection array 102.

Accordingly, as the fingerprint platform 106 is moved relative to the detection surface 102A of the detection array 102, a series of partial fingerprint images are reflected onto detection surface 102A of the detection array 102. Accordingly, the detection array 102 may be configured to receive the reflected partial fingerprint images from the fingerprint platform 106 at a relatively continuous rate or at desired or specified time intervals based upon the actuation of the illumination source 104, or based upon the movement of the fingerprint platform 106.

For instance, the illumination source 104 may be configured to actuate based upon the movement of the fingerprint platform 106, or when the fingerprint platform moves to a specified or particular location or position. Likewise, the processing device 110 is configured to receive the series of partial fingerprint images, or data representing the partial fingerprint images, from the detection array 102 at a relatively continuous rate or at desired or specified time intervals, with respect to the actuation of the illumination source 104, based upon the users preference or on the operational needs of the fingerprint detection device 100.

Figure 3A:
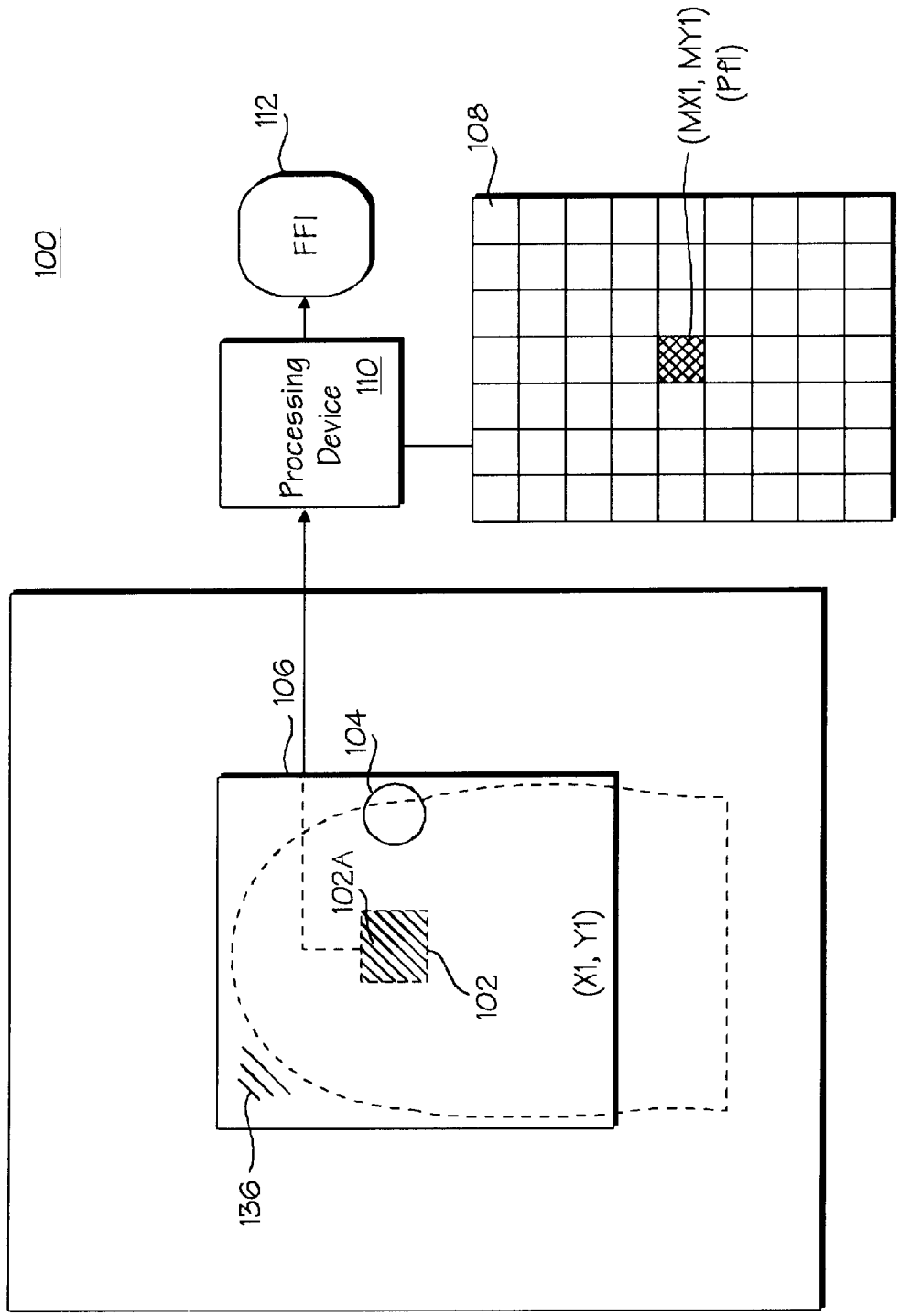
FIGS. 3A/B and 3C/D illustrate operational embodiments of the fingerprint detection device capable of implementing the teachings of the present invention.

In one embodiment, as illustrated in FIGS. 3A/B and C/D, the processing device 110 tracks the movement of the fingerprint platform 106 as the fingerprint platform 106 is moved relative to the detection surface 102A of the detection array 102. The processing device 110 may track the movement of the fingerprint platform 106 as the fingerprint platform 106 is moved relative to the detection surface 102A of the detection array 102 by using a variety of well known tracking techniques and devices (e.g., roller-wheel encoding devices, potentiometers, piezo-electric sensors, etc.).

FIGS. 3A and 3C illustrate the fingerprint detection device 100 with a fingertip/fingerprint (indicated by the broken line) placed onto the sensing surface 136 of the fingerprint platform 106.

In the embodiment of FIGS. 3A/B and C/D, the position of the fingerprint platform 106, at any instance, is mapped against the physical memory of the memory device 108. As such, each position of the fingerprint platform 106 is mapped against or corresponds to a physical memory location within the memory device 108, wherein each position of the fingerprint platform 106, and thereby each partial fingerprint image reflected onto the detection surface 102A of the detection array 102 at the corresponding fingerprint platform 106 position, corresponds to a specific physical memory location within the memory device 108.

Figure 3B:
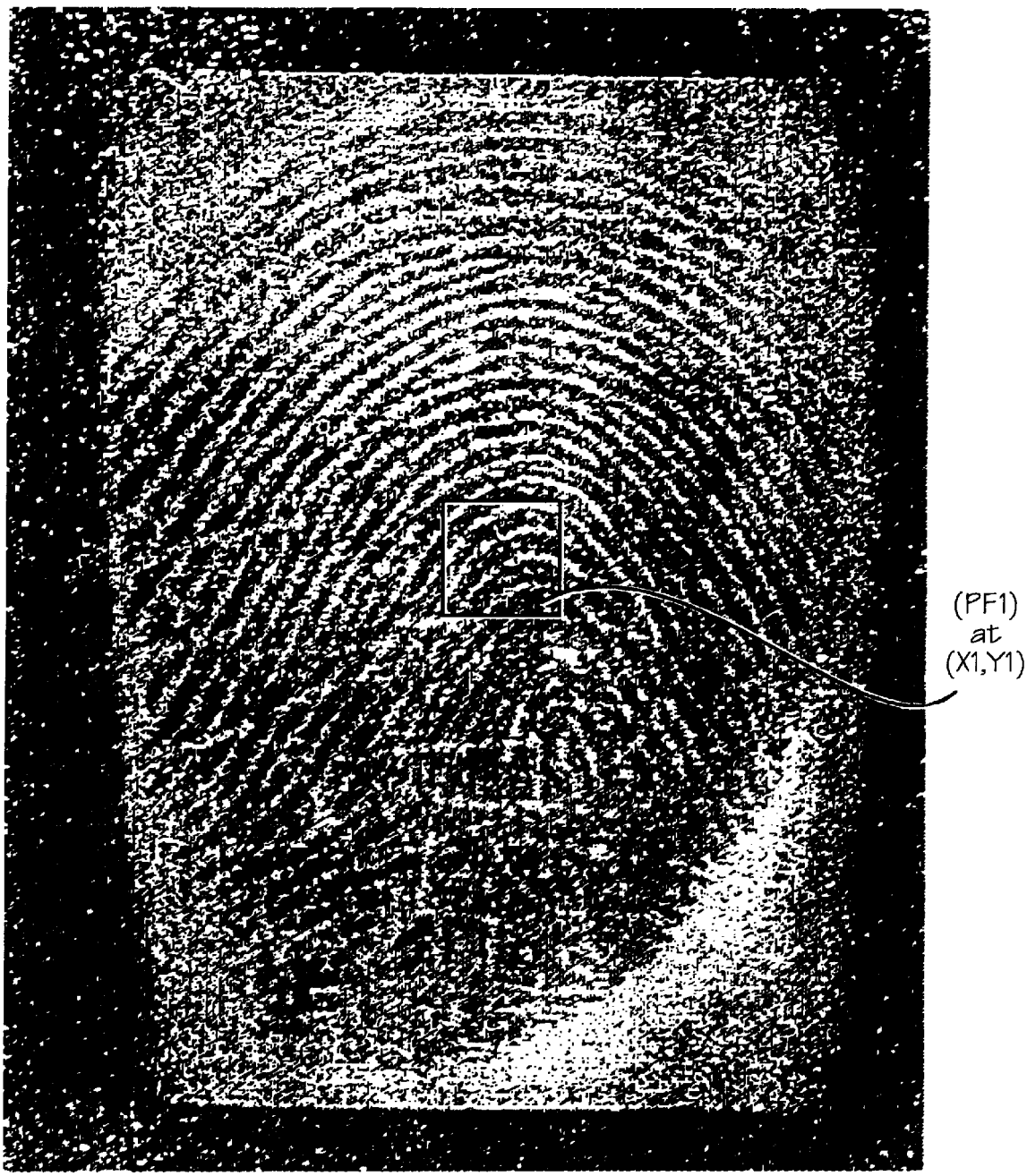

For instance, as illustrated in FIGS. 3A/B, as the fingerprint platform 106 initially resides at a first position (X1, Y1) in FIG. 3A, a partial fingerprint image (PF1) is reflected onto the detection surface 102A of the detection array 102, as illustrated in FIG. 3B. Accordingly, the position of the fingerprint platform 106 at (X1, Y1) corresponds to (i.e., mapped against) a specific memory location within the memory device 108 (MX1, MY1). Correspondingly, the partial fingerprint image (PF1) reflected onto the detection surface 102A of the detection array 102 at the position (X1, Y1) likewise corresponds to the specific memory location within the memory device 108 (MX1, MY1). Accordingly, the partial fingerprint image (PF1) is plotted or written to the corresponding memory location within the memory device 108 (MX1, MY1) by the processing device 110.

Figure 3D:
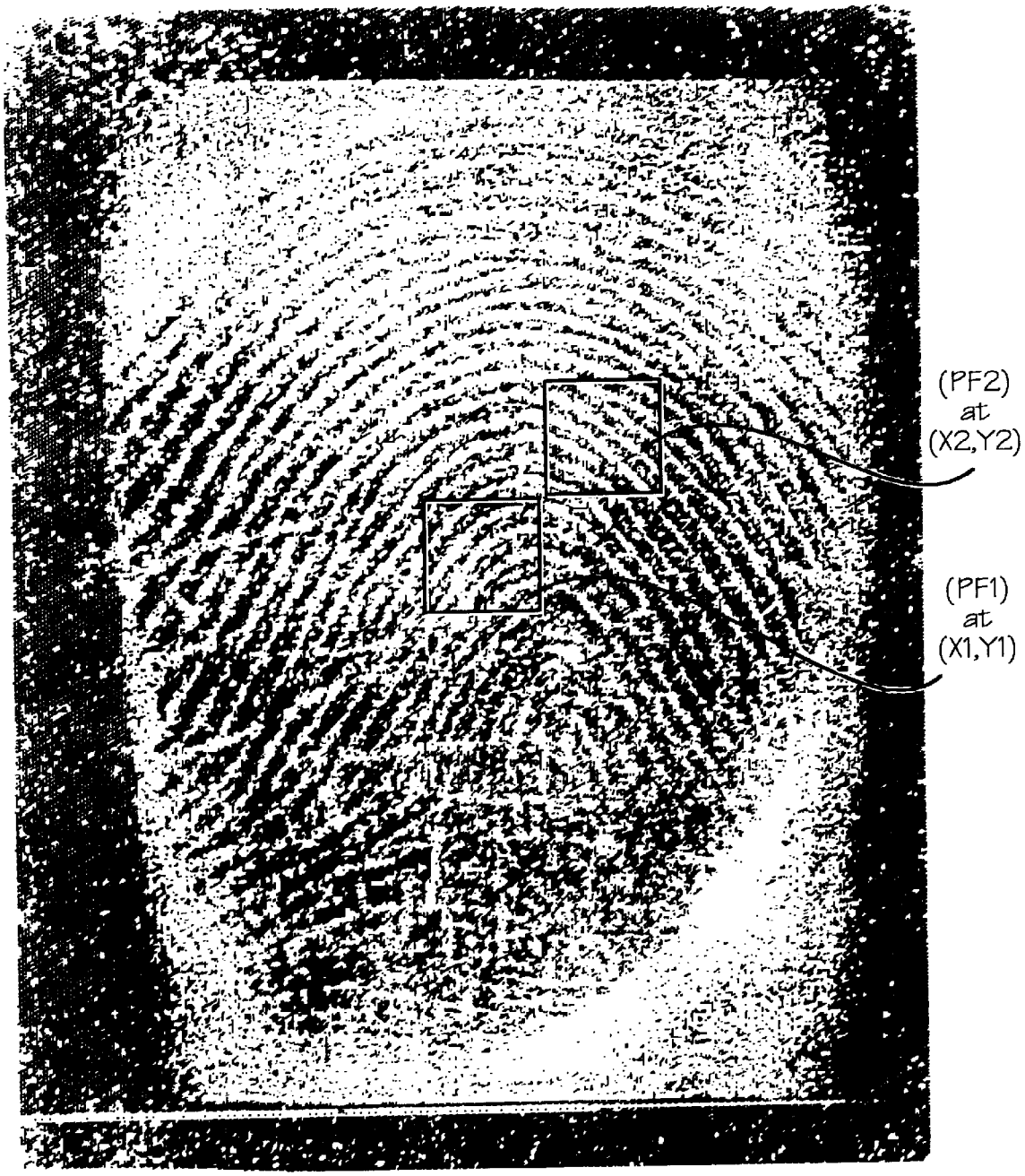

As the fingerprint platform 106 is moved to a second position (X2, Y2), as illustrated in FIG. 3C, a second partial fingerprint image (PF2) is reflected onto the detection surface 102A of the detection array 102, as illustrated by FIG. 3D. Accordingly, the position of the fingerprint platform 106 at (X2, Y2) corresponds to (i.e., mapped against) a specific memory location within the memory device 108 (MX2, MY2). Correspondingly, the partial fingerprint image (PF2) reflected onto the detection surface 102A of the detection array 102 at the position (X2, Y2) likewise corresponds to the specific memory location within the memory device 108 (MX2, MY2). Accordingly, the partial fingerprint image (PF2) is plotted or written to the corresponding memory location within the memory device 108 (MX2, MY2) by the processing device 110.

This process is repeated for each movement or position of the fingerprint platform 106, thereby generating a series of partial fingerprint images (PFx) which are plotted or written to the corresponding memory location within the memory device 108 (MXx, MYx) in order to generate a final fingerprint image (FFI) 112. As such, the processing device 110 is configured to construct a final fingerprint image (FFI) 112 from the series of partial fingerprint images (PFx) reflected onto detection surface 102A of the detection array 102. As mentioned above, the final fingerprint image (FFI) 112 may be a partial or full representation of an entire fingerprint or fingerprint image. As the series of partial fingerprint images (PFx) are written to the corresponding memory location within the memory device 108 (MXx, MYx), a final fingerprint image (FFI) 112 is generated from the series of partial fingerprint images (PFx). Accordingly, the final fingerprint image (FFI) 112 may be used for a variety of identification purposes in a variety of identification applications.

Therefore, as the fingerprint platform 106 is moved relative to the detection surface 102A of the detection array 102, a series of partial fingerprint images (PFx) are reflected onto detection surface 102A of the detection array 102. Accordingly, each position of the fingerprint platform 106 is mapped against or corresponds to specific memory location within the memory device 108, wherein each position of the fingerprint platform 106, and thereby each partial fingerprint image reflected onto the detection surface 102A of the detection array 102, corresponds to a specific memory location within the memory device 108. Correspondingly, the series of partial fingerprint images (PFx) are plotted or written to the corresponding memory location within the memory device 108 (MXx, MYx) in order to generate a final fingerprint image (FFI) 112.

In an alternate embodiment, as illustrated in FIG. 4, the fingerprint platform 106 may have an associated platform pattern (PP) 138 which may be incorporated into the fingerprint platform 106. In the embodiment of FIG. 4, the associated platform pattern (PP) 138 is represented as a simple numerical pattern, however, it is readily apparent that the associated platform pattern (PP) 138 may comprise any type of pattern or pattern type (e.g., symbol pattern, geometric pattern, etc.) as desired.

Accordingly, as a fingerprint (i.e., fingertip) is applied to the sensing surface 136 of the fingerprint platform 106, the fingerprint has a specific relative orientation with respect to the associated platform pattern (PP) 138. As such, each section or segment of the fingerprint or fingerprint image has a specific relative orientation with respect to the associated platform pattern (PP) 136.

In the embodiment of FIG. 4, the platform pattern (PP) 138 associated with the fingerprint platform 106 is mapped against the physical memory of the memory device 108. The platform pattern (PP) 138 associated with the fingerprint platform 106 is comprised of a series of platform pattern segment (PPS) 140, wherein each platform pattern segment (PPS) 140 corresponds to a particular physical memory location within the memory device 108. As such, each platform pattern segment (PPS) 140 corresponds to a physical memory location within the memory device 108. As such, the processing device 110 is configured to plot each platform pattern segment (PPS) 140 to the corresponding physical location in the memory device 108, as the fingerprint platform 106 is moved relative to the detection surface 102A of the detection array 102.

Accordingly, as a fingerprint is applied to the sensing surface 102A of the fingerprint platform 102, a partial fingerprint image (PFp) and the associated platform pattern segment (PPS) 140 corresponding to that partial fingerprint image (PFp) are reflected onto the detection surface 102A of the detection array 102. In the embodiment of FIG. 4, the processing device 110 is configured to recognize each platform pattern segment (PPS) 140 of the platform pattern (PP) 138 associated with the fingerprint platform 106. Accordingly, the processing device 110 is configured to plot each platform pattern segment (PPS) 140, along with the corresponding partial fingerprint image (PFp) associated with each platform pattern segment (PPS) 140, reflected onto the detection surface 102A of the detection array 102, to the corresponding physical memory location within the memory device 108. Accordingly, the processing device 110 then writes the corresponding plotted partial fingerprint image (PFp) to the corresponding physical memory location in the memory device 108 which is associated with the platform pattern segment (PPS) 140.

Figure 5A:
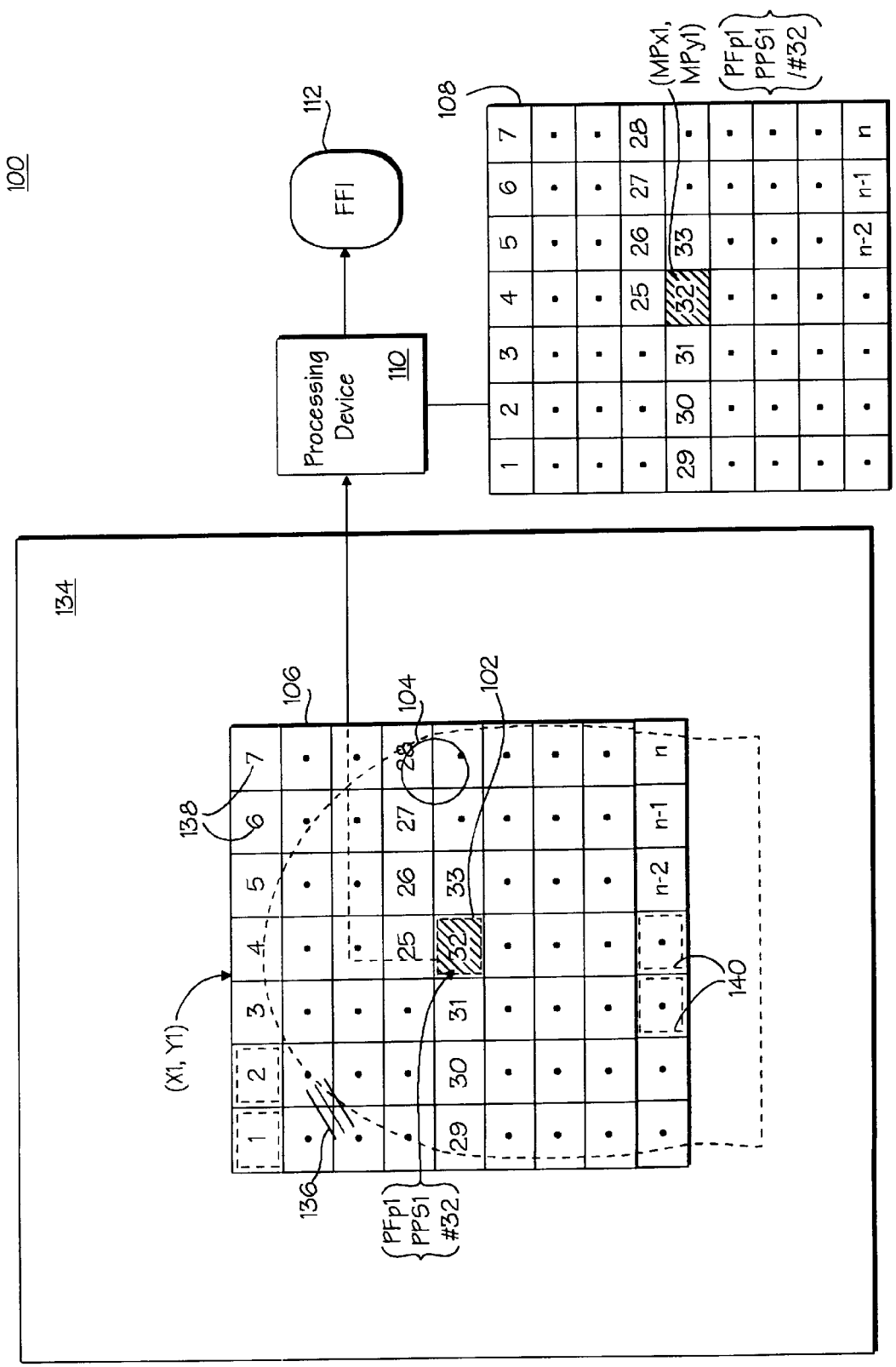
FIGS. 5A/B and 5C/D illustrate operational embodiments of the fingerprint detection device capable of implementing the teachings of the present invention.

FIGS. 5A/B and C/D illustrate an example of the fingerprint detection device 100 embodied in FIG. 4, wherein fingertip/fingerprint (indicated by the broken line) is applied to the sensing surface 136 of the fingerprint platform 106.

Figure 5B:
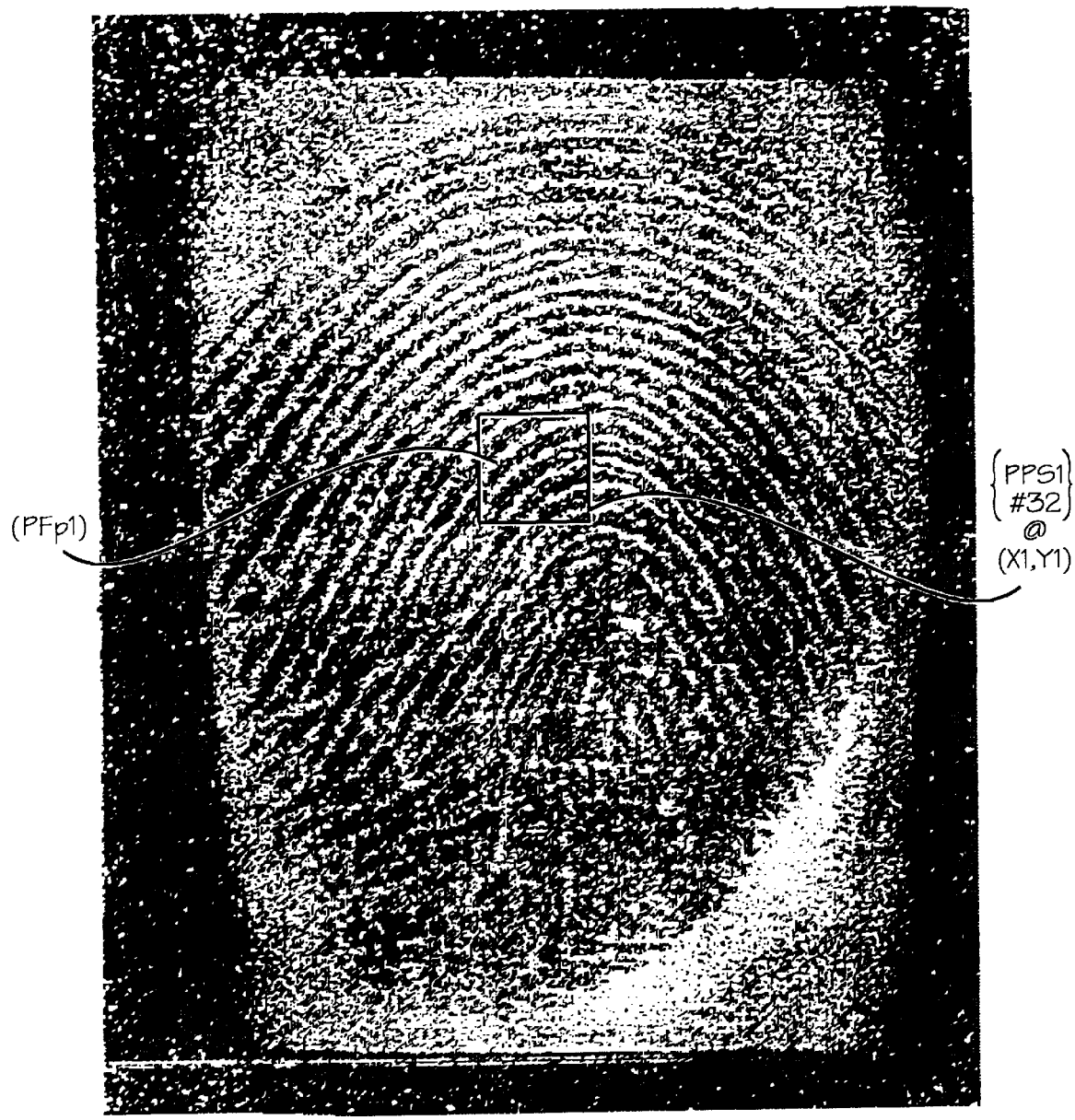

As the fingerprint platform 106 initially resides at a first position (X1, Y1), in FIG. 5A, a platform pattern segment (PPS1/#32) 140, along with the corresponding associated partial fingerprint image (PFp1), are reflected onto the detection surface 102A of the detection array 102, as illustrated in FIG. 5B. Accordingly, the platform pattern segment (PPS1/#32) 140 corresponds to (i.e., mapped against) a specific physical memory location within the memory device (MPx1, MPy1) 108. Correspondingly, the partial fingerprint image (PFp1) reflected onto the detection surface 102A of the detection array 102 that is associated with the platform pattern segment (PPS1) 140, likewise corresponds to the specific physical memory location within the memory device (MPx1, MPy1) 108. Accordingly, the processing device 110 then writes the corresponding plotted partial fingerprint image (PFp1) to the corresponding physical memory location (MPx1, MPy1) in the memory device 108 which is associated with the platform pattern segment (PPS1) 140.

Figure 5D:
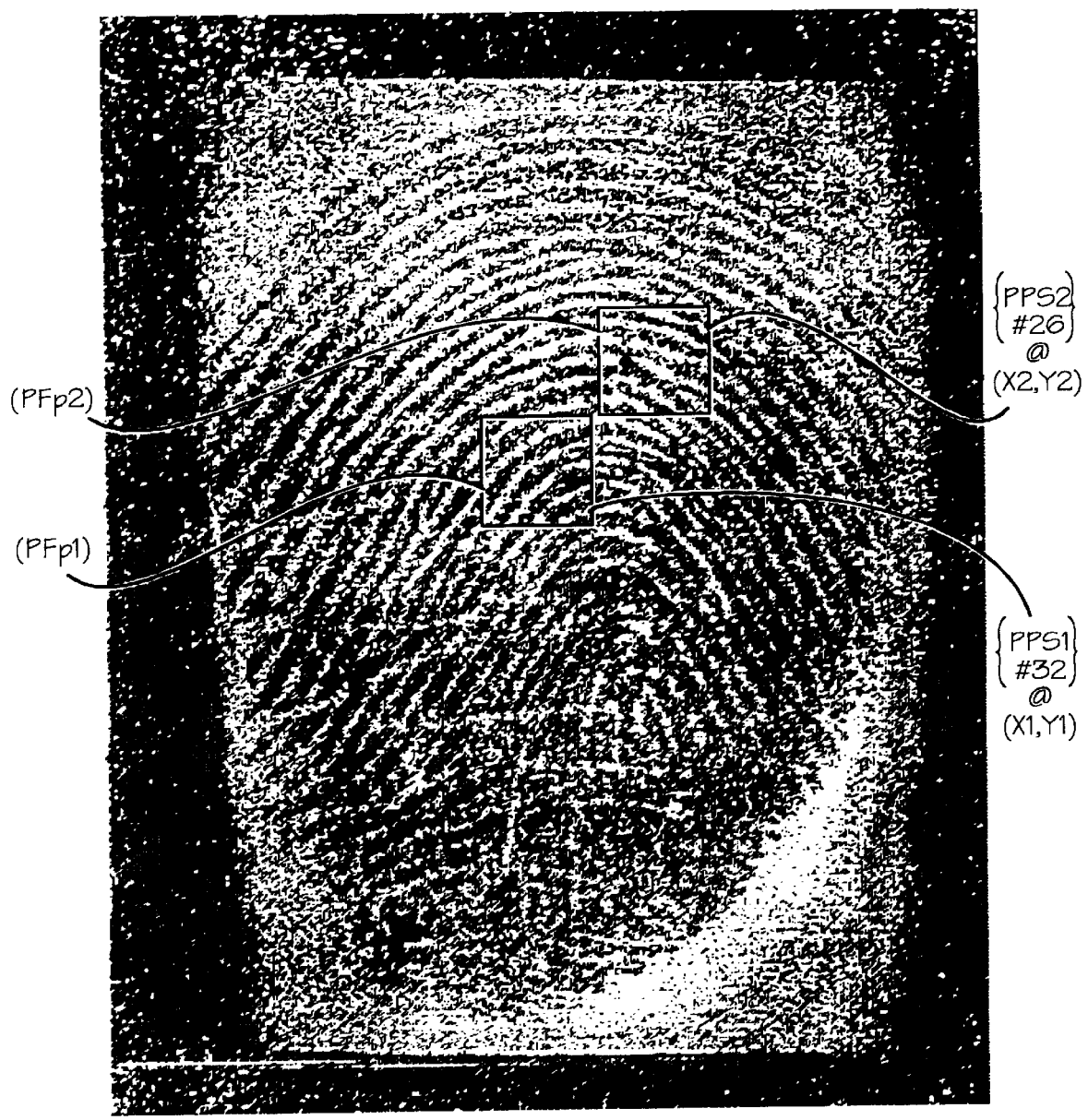

As the fingerprint platform is moved to a second position (X2, Y2), as illustrated in FIG. 5C, a second platform pattern segment (PPS2/#26) 140, along with the associated corresponding partial fingerprint image (PFp2), are reflected onto the detection surface 102A of the detection array 102, as illustrated in FIG. 5D. Accordingly, the platform pattern segment (PPS2) 140 corresponds to (i.e., mapped against) a specific physical memory location within the memory device (MPx2, MPy2) 108. Correspondingly, the partial fingerprint image (PFp2) reflected onto the detection surface 102A of the detection array 102 that is associated with the platform pattern segment (PPS2) 140, likewise corresponds to the specific physical memory location within the memory device (MPx2, MPy2) 108. Accordingly, the processing device 110 then writes the corresponding plotted partial fingerprint image (PFp2) to the corresponding physical memory location (MPx2, MPy2) in the memory device 108 which is associated with the platform pattern segment (PPS2) 140.

This process is repeated for each movement of the fingerprint platform 106, thereby generating a series of partial fingerprint images (PFpx) which are plotted or written to the corresponding memory location within the memory device 108 (MPx, MPy) in order to generate a final fingerprint image 112. As such, the processing device 110 is configured to construct a final fingerprint image 112 from the series of partial fingerprint images (PFpx) reflected onto the detection surface 102A of the detection array 102. As mentioned above, the final fingerprint image 112 may be a partial or full representation of an entire fingerprint. As the series of partial fingerprint images (PFpx) are written to the corresponding memory locations within the memory device 108 (MPx, MPy), a final fingerprint image (FFI) 112 is generated from the series of partial fingerprint images (PFpx). Accordingly, the final fingerprint image 112 may be used for a variety of identification purposes in a variety of identification applications.

Therefore, as the fingerprint platform 106 is moved relative to the detection surface 102A of the detection array 102, a series of partial fingerprint images (PFpx), along with the corresponding platform pattern segments (PPS) 140 corresponding to the series of partial fingerprint images (PFpx), are reflected onto the detection surface 102A of the detection array 102. Accordingly, the processing device 110 is configured to plot each platform pattern segment (PPS) 140, along with the corresponding partial fingerprint image (PFpx) reflected onto detection surface 102A of the detection array 102, to the corresponding physical memory location within the memory device 108. Accordingly, the processing device 110 then writes the corresponding plotted partial fingerprint image (PFpx) to the corresponding physical memory location in the memory device 108 associated with the platform pattern segment (PPS) 140 in order to generate a final fingerprint image (FFI) 112.

Figure 6A:
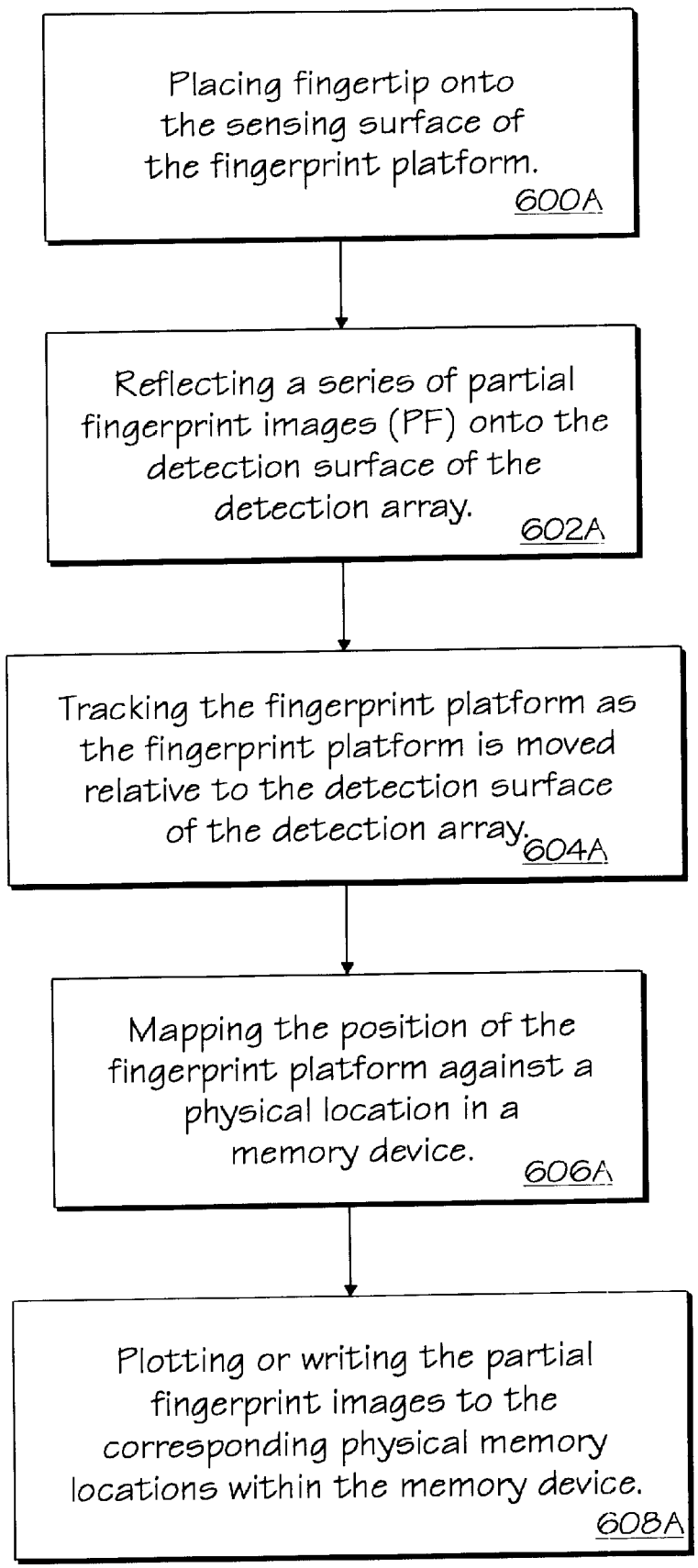
FIG. 6A illustrates an embodiment for a method of operation for the fingerprint detection device capable of implementing the teachings of the present invention.

FIG. 6A illustrates one embodiment for a method of operation for the fingerprint detection device 100, in block-flow format, capable of implementing the teachings of the present invention.

Initially, at Step 600A, a user places a fingertip/fingerprint onto the sensing surface 136 of the fingerprint platform 106.

Accordingly, at Step 602A, a partial fingerprint image(s) (PF) is reflected onto the detection surface 102A of the detection array 102. As the fingerprint platform 106 is moved relative to the detection surface 102A of the detection array 102 a series of partial fingerprint images are reflected onto the detection surface 102A of the detection array 102.

At Step 604A, each movement or position of the fingerprint platform 106 is tracked as the fingerprint platform 106 is moved relative to the detection surface 102A of the detection array 102. Accordingly, as the fingerprint platform is moved relative to the detection surface 102A of the detection array 102, a series of partial fingerprint images (PFx) are reflected onto the detection surface 102A of the detection array 102. Accordingly, the associated position of the fingerprint platform 106 corresponding to each of the partial fingerprint images (PFx) is tracked as the fingerprint platform 106 is moved relative to the detection surface 102A of the detection array 102.

At Step 606A, the position of the fingerprint platform 106 is mapped against a physical location in a memory device 108, wherein each position of the fingerprint platform 106, and thereby each partial fingerprint image (PFx) reflected onto the detection surface 102A of the detection array 102, corresponds to a specific physical memory location (MX, MY) within the memory device 108.

At Step 608A, the partial fingerprint images (PFx) are plotted or written to the corresponding physical memory locations within the memory device 108 (MX, MY). This process is repeated for each movement of the fingerprint platform 106, thereby generating a series of partial fingerprint images (PFx) which are plotted or written to each corresponding memory location within the memory device 108 (MX, MY), in order to generate a final fingerprint image (FFI) 112. As such, a final fingerprint image (FFI) 112 is generated from the series of partial fingerprint images (PFx) reflected onto the detection surface 102A of the detection array 102. As mentioned above, the final fingerprint image (FFI) 112 may be a partial or full representation of an entire fingerprint. Accordingly, the final fingerprint image (FFI) 112 may be used for a variety of identification purposes in a variety of identification applications.

Figure 6B:
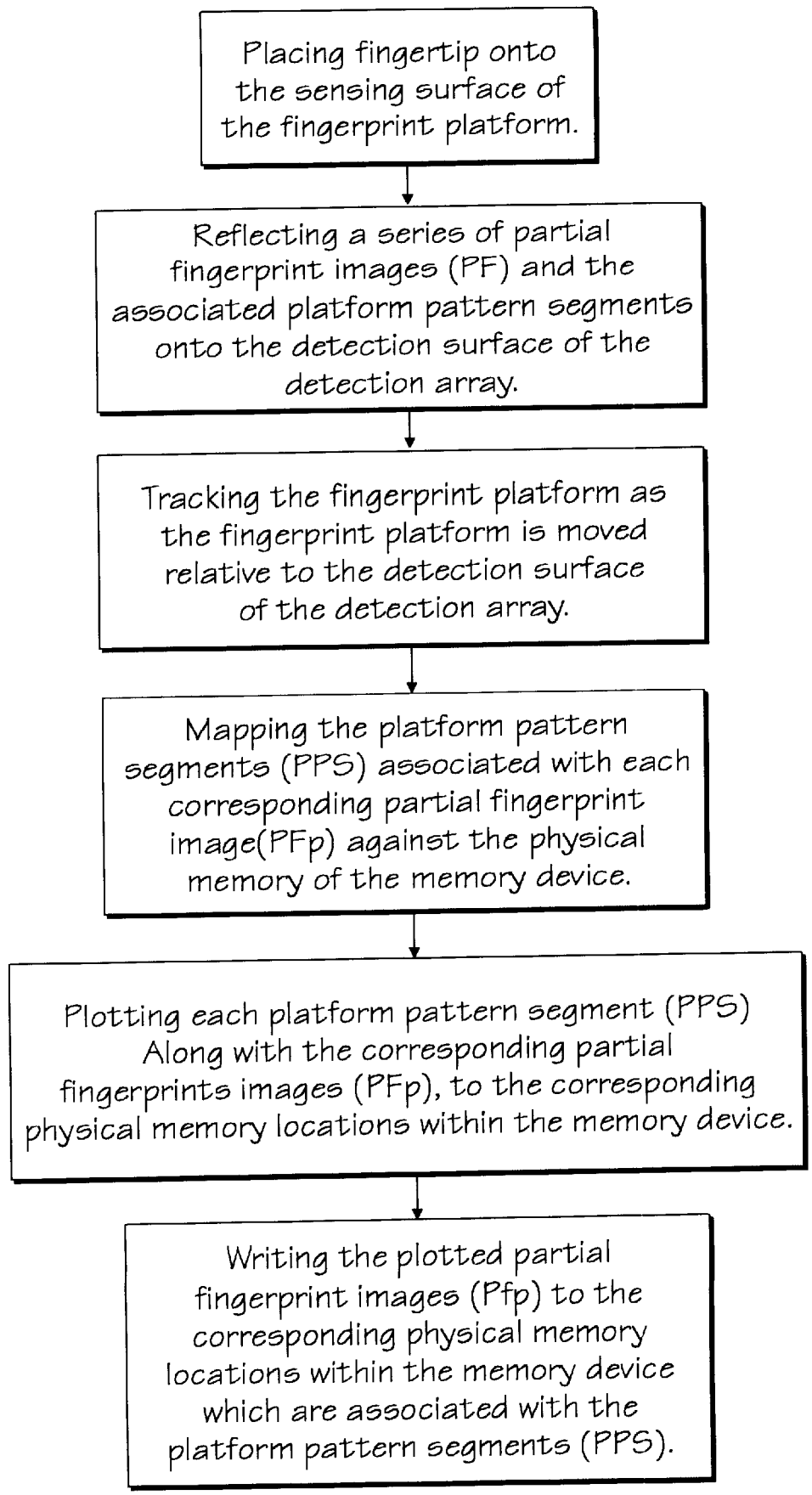
FIG. 6B illustrates an alternate embodiment for a method of operation for the fingerprint detection device capable of implementing the teachings of the present invention.

FIG. 6B illustrates another embodiment for a method of operation for the fingerprint detection device 100, in block-flow format, capable of implementing the teachings of the present invention.

Initially, at Step 600A, a user places a fingertip onto the sensing surface 136 of the fingerprint platform 106.

Accordingly, at Step 602B, a partial fingerprint image (PFp), along with an associated platform pattern segment (PPS) corresponding to the partial fingerprint image (PFp), are reflected onto the detection surface 102A of the detection array 102. Accordingly, as the fingerprint platform 106 is moved relative to the detection surface 102A of the detection array 102, a series of partial fingerprint images (PFp) and the associated platform pattern segments (PPS) 140 corresponding to the partial fingerprint images (PFp) are reflected onto the detection surface 102A of the detection array 102.

At Step 604B, the platform pattern segments (PPS) 140 associated with each of the corresponding partial fingerprint images (PFp) are mapped against the physical memory of the memory device 108. The platform pattern (PP) 138 associated with the fingerprint platform 106 is comprised of a series of platform pattern segment (PPS) 140, wherein each platform pattern segment (PPS) 140 corresponds to a particular physical memory location within the memory device 108. As such, each platform pattern segment (PPS) 140 corresponds to a physical memory location within the memory device 108.

At Step 606B, each platform pattern segment (PPS) 140 is plotted to the corresponding physical memory location in the memory device 108 as the fingerprint platform 106 is moved relative to the detection surface 102A of the detection array 102. Accordingly, each platform pattern segment (PPS) 140, along with the corresponding partial fingerprint image (PFp) reflected onto the detection surface 102A of the detection array 102, are plotted to the corresponding physical memory locations within the memory device 108.

Accordingly, at Step 608B, the plotted partial fingerprint images (PFp) are written to the corresponding physical memory locations in the memory device 108 which are associated with the platform pattern segment (PPS) 140 to generate a final fingerprint image (FFI) 112. This process is repeated for each movement of the fingerprint platform 106, thereby generating a series of partial fingerprint images (PFp) which are written to the corresponding memory locations within the memory device 108 (MPx, MPy) in order to generate a final fingerprint image (FFI) 112. As such, a final fingerprint image (FFI) 112 is generated from the series of partial fingerprint images (PFp) reflected onto the detection surface 102A of the detection array 102. As mentioned above, the final fingerprint image (FFI) 112 may be a partial or full representation of an entire fingerprint. Accordingly, the final fingerprint image (FFI) 112 may be used for a variety of identification purposes in a variety of identification applications.

Figure 7:
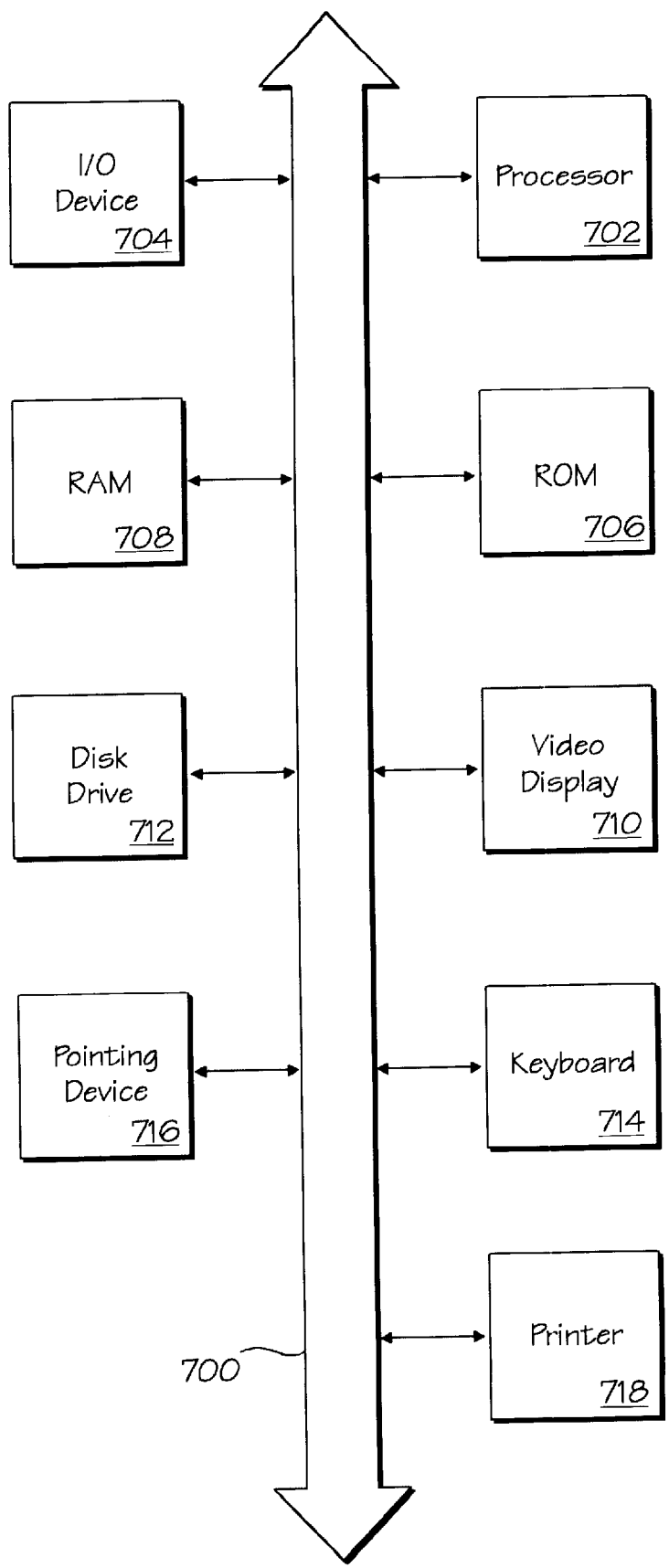
FIG. 7 illustrates an embodiment of a computer system that can be used with the present invention.

FIG. 7 illustrates an embodiment of a computer system that can be used with the present invention. The various components shown in FIG. 7 are provided by way of example. Certain components of the computer in FIG. 7 can be deleted from the addressing system for a particular implementation of the invention. The computer shown in FIG. 7 may be any type of computer including a general purpose computer.

FIG. 7 illustrates a system bus 700 to which various components are coupled. A processor 702 performs the processing tasks required by the computer. Processor 702 may be any type of processing device capable of implementing the steps necessary to perform the addressing and delivery operations discussed above. An input/output (I/O) device 704 is coupled to bus 700 and provides a mechanism for communicating with other devices coupled to the computer. A read-only memory (ROM) 706 and a random access memory (RAM) 708 are coupled to bus 700 and provide a storage mechanism for various data and information used by the computer. Although ROM 706 and RAM 708 are shown coupled to bus 700, in alternate embodiments, ROM 706 and RAM 708 are coupled directly to processor 702 or coupled to a dedicated memory bus (not shown).

A video display 710 is coupled to bus 700 and displays various information and data to the user of the computer. A disk drive 712 is coupled to bus 700 and provides for the long-term mass storage of information. Disk drive 712 may be used to store various profile data sets and other data generated by and used by the addressing and delivery system. A keyboard 714 and pointing device 716 are also coupled to bus 700 and provide mechanisms for entering information and commands to the computer. A printer 718 is coupled to bus 700 and is capable of creating a hard-copy of information generated by or used by the computer.

Figure 8A:
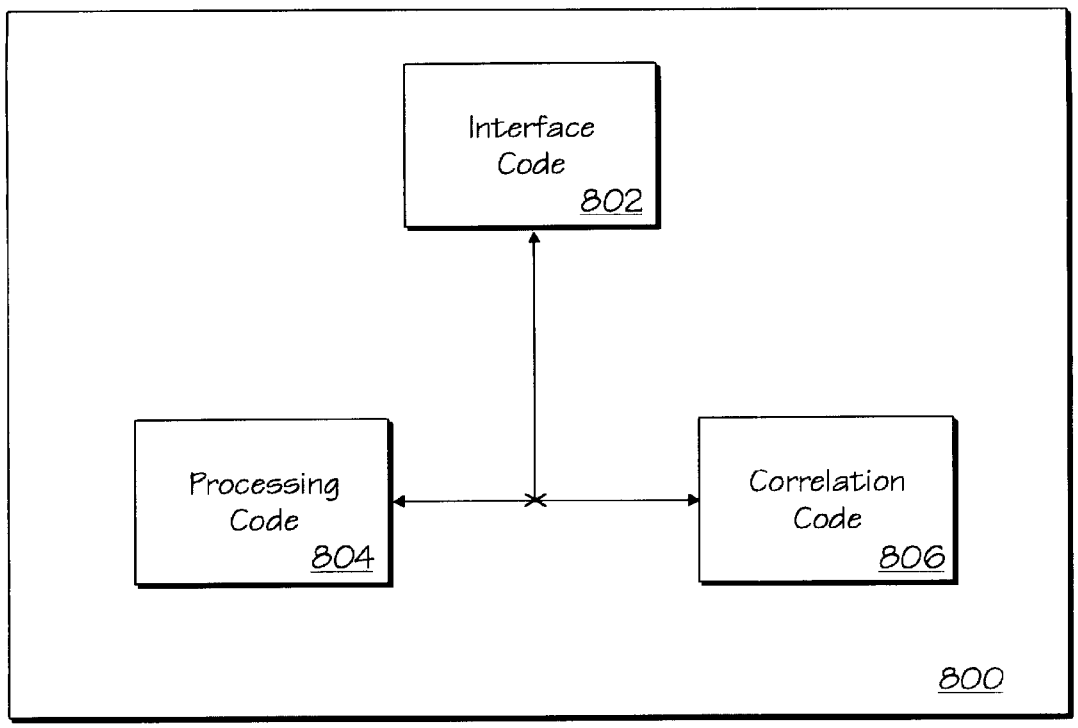
FIGS. 8A/B illustrate embodiments of a computer-readable medium capable of implementing the teachings of the present invention.

FIGS. 8A/B illustrate embodiments of a computer-readable medium 800 containing various sets of instructions, code sequences, configuration information, and other data used by a computer or other processing device. The embodiments illustrated in FIGS. 8A/B are suitable for use with the a fingerprint detection device 100 described above. The various information stored on medium 800 is used to perform various data processing operations. Computer-readable medium 800 is also referred to as a processor-readable medium. Computer-readable medium 800 can be any type of magnetic, optical, or electrical storage medium including a diskette, magnetic tape, CD-ROM, memory device, or other storage medium.

Computer-readable medium 800 includes interface code 802 that controls the flow of information between various devices or components in the a fingerprint detection device. Interface code 802 may control the transfer of information within a device (e.g., between the processor and a memory device), or between an input/output port and a storage device. Additionally, interface code 802 may control the transfer of information from one device to another.

In one embodiment, illustrated in FIG. 8A, the computer-readable medium 800 includes processing code 804 for tracking the movement of a fingerprint platform as the fingerprint platform is moved relative to a detection surface of a detection array. When a fingertip is placed onto a sensing surface of the fingerprint platform, a partial fingerprint image (PFx) is reflected onto the detection surface of the detection array. Accordingly, as the fingerprint platform is moved relative to the detection surface of the detection array, a series of partial fingerprint images are reflected onto the detection surface of the detection array.

Correlation code 806 is used for mapping the position of the fingerprint platform against a corresponding physical memory location in a memory device, wherein each position of the fingerprint platform, and thereby each partial fingerprint image (PFx) reflected onto the detection surface of the detection array, corresponds to a specific physical memory location (MX, MY) within the memory device.

The correlation code 806 is then used to plot or write the partial fingerprint images (PFx) to the corresponding physical memory location within the memory device (MX, MY). This process is repeated for each movement of the fingerprint platform, thereby generating a series of partial fingerprint images (PFx) which are plotted or written to the corresponding physical memory locations within the memory device (MX, MY), by the correlation code 806, in order to generate a final fingerprint image (FFI). As such, a final fingerprint image (FFI) is generated from the series of partial fingerprint images (PFx) reflected onto the detection surface of the detection array. As mentioned above, the final fingerprint image (FFI) may be a partial or full representation of an entire fingerprint. Accordingly, the final fingerprint image (FFI) may be used for a variety of identification purposes in a variety of identification applications.

Therefore, as the fingerprint platform is moved relative to the detection surface of the detection array, a series of partial fingerprint images (PFx) are reflected onto the detection surface of the detection array. generated. Accordingly, the position of the fingerprint platform is mapped against the physical memory of the memory device, wherein each position of the fingerprint platform, and thereby each partial fingerprint image reflected onto the detection surface of the detection array, corresponds to a specific memory location within the memory device. Correspondingly, the series of partial fingerprint images (PFx) are plotted or written to the corresponding memory locations within the memory device (MXx, MYx) in order to generate a final fingerprint image.

Figure 8B:
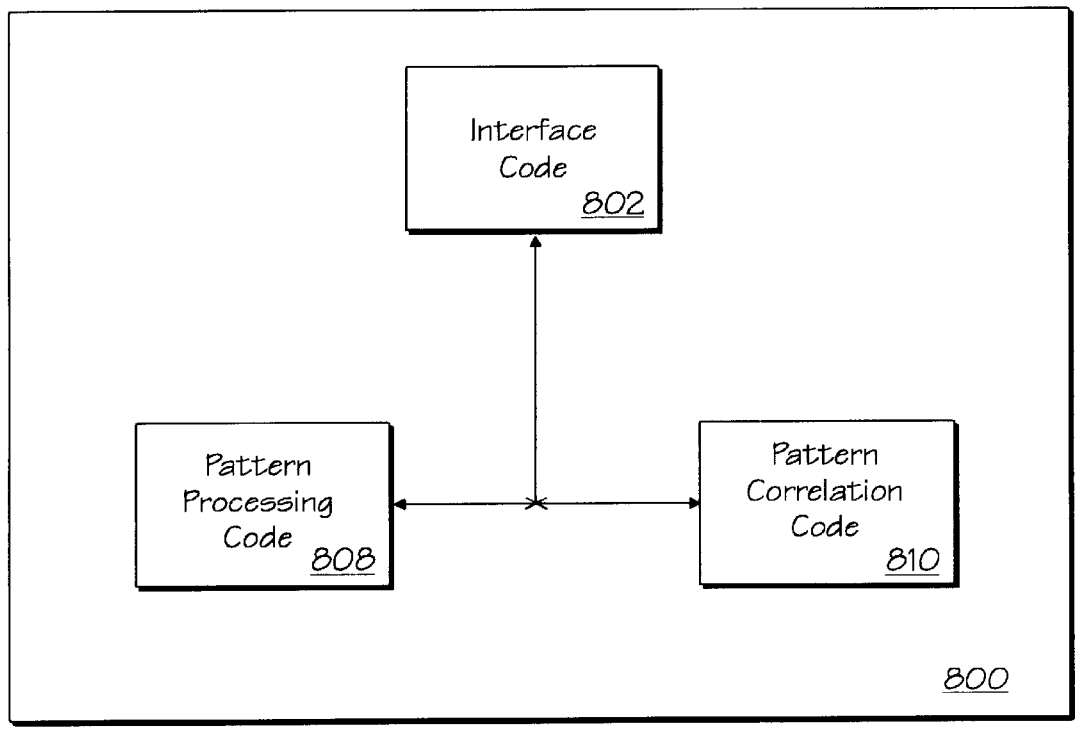

In an alternate embodiment, illustrated in FIG. 8B, the computer-readable medium 800 includes pattern processing code 808 for identifying a platform pattern (PP) associated with the fingerprint platform. Each platform pattern (PP) associated with a fingerprint platform is comprised of a series of platform pattern segment (PPS), wherein each platform pattern segment (PPS) corresponds to a particular physical memory location within a memory device. As such, each platform pattern segment (PPS) corresponds to a physical memory location within the memory device.

When a fingertip is placed onto a sensing surface of the fingerprint platform, a partial fingerprint image (PFp), along with an associated platform pattern segment (PPS) corresponding to the partial fingerprint image (PFp), are reflected onto the detection surface of the detection array. Accordingly, as the fingerprint platform is moved relative to the detection surface of the detection array, a series of partial fingerprint images (PFp) and the associated platform pattern segments (PPS) corresponding to the partial fingerprint images (PFp) are reflected onto the detection surface of the detection array.

Pattern correlation code 810 is used for mapping the platform pattern segments (PPs) associated with each of the corresponding partial fingerprint images (PFp) against the physical memory of the memory device. The platform pattern (PP) associated with the fingerprint platform is comprised of a series of platform pattern segment (PPS), wherein each platform pattern segment (PPS) corresponds to a particular physical memory location within the memory device. As such, each platform pattern segment (PPS) corresponds to a physical memory location within the memory device.

The pattern correlation code 810 is then used to plot each platform pattern segment (PPS) to the corresponding physical memory location in the memory device, as the fingerprint platform is moved relative to the detection surface of the detection array. Accordingly, each platform pattern segment (PPS), along with the corresponding partial fingerprint image (PFp) reflected onto the detection surface of the detection array, are plotted to the corresponding physical memory location within the memory device.

Accordingly, the pattern correlation code 810 then writes the corresponding plotted partial fingerprint image (PFp) to the corresponding physical memory location associated with the platform pattern segment (PPS) in order to generate a final fingerprint image (FFI). As such, a final fingerprint image (FFI) is generated from the series of partial fingerprint images (PFp) reflected onto the detection surface of the detection array. As mentioned above, the final fingerprint image (FFI) may be a partial or full representation of an entire fingerprint. Accordingly, the final fingerprint image (FFI) may be used for a variety of identification purposes in a variety of identification applications.

Therefore, as the fingerprint platform is moved relative to the detection surface of the detection array, a series of partial fingerprint images (PFx), along with the corresponding platform pattern segments (PPS) corresponding to the series of partial fingerprint images (PFp), are reflected onto the detection surface of the detection array. Accordingly, the processing device is configured to plot each platform pattern segment (PPS), along with the corresponding partial fingerprint image (PFp) reflected onto the detection surface of the detection array, to the corresponding physical memory location within the memory device. Accordingly, the processing device then writes the corresponding plotted partial fingerprint image (PFp) to the corresponding physical memory location associated with the platform pattern segment (PPS) in order to generate a final fingerprint image.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A fingerprint detection apparatus comprising:
    a detection array having a detection surface;
    a fingerprint platform configured to supply a plurality of partial fingerprint images of a fingerprint to the detection surface as the fingerprint is moved relative to the detection surface; and
    a processing device configured to construct a final fingerprint image from the plurality of partial fingerprint images supplied to the detection surface.

2. The apparatus of claim 1, wherein the fingerprint platform comprises a sheet prism.

3. The apparatus of claim 1, wherein the fingerprint platform is configured to move relative to the detection surface of the detection array, the processing device is configured to track the movement of the fingerprint platform relative to the detection surface and construct a fingerprint image from the plurality of partial fingerprint images supplied to the detection surface based upon the tracked movement of the fingerprint platform.

4. The apparatus of claim 1, wherein the fingerprint platform moves relative to the detection surface of the detection array.

5. The apparatus of claim 4, wherein the processing device tracks each position of the fingerprint platform as the fingerprint platform moves relative to the detection surface of the detection array.

6. The apparatus of claim 5, further including a memory device, each position of the fingerprint platform corresponding to a specific physical location within the memory device.

7. The apparatus of claim 6, wherein an individual partial fingerprint image is reflected onto the detection surface of the detection array at each position of the fingerprint platform.

8. The apparatus of claim 7, wherein the processing device writes each individual partial fingerprint image associated with each position of the fingerprint platform to the corresponding specific physical location within the memory device.

9. The apparatus of claim 8, wherein the processing device constructs a final fingerprint image from the individual partial fingerprint images written to the memory device.

10. The apparatus of claim 4, wherein a platform pattern is associated with the fingerprint platform, the platform pattern comprising a plurality of partial platform patterns, each partial fingerprint image of the plurality of partial fingerprint images being associated with an individual partial platform pattern.

11. The apparatus of claim 10, wherein the partial fingerprint images and the associated partial platform patterns associated with each individual partial fingerprint are reflected onto the detection surface as the fingerprint is moved relative to the detection surface.

12. The apparatus of claim 11, further including a memory device, each partial platform pattern associated with the fingerprint platform corresponding to a specific physical location within the memory device.

13. The apparatus of claim 12, wherein the processing device writes each individual partial fingerprint image associated with each partial platform pattern to the corresponding specific physical location within the memory device.

14. The apparatus of claim 13, wherein the processing device constructs a final fingerprint image from the individual partial fingerprint images written to the memory device.

15. A method of generating a fingerprint image, the method comprising the steps of:
    supplying a plurality of partial fingerprint images of a fingerprint to a detection surface of a detection array as the fingerprint is moved relative to the detection surface; and
    constructing a final fingerprint image from the plurality of partial fingerprint images.

16. The method of claim 15, wherein the step of constructing a final fingerprint image comprises:
    tracking each position of a fingerprint platform relative to the detection surface; and
    constructing a final fingerprint image from plurality of partial fingerprint images supplied to the detection surface based upon the tracked movement of the fingerprint platform.

17. The method of claim 15, wherein the step of supplying the plurality of partial fingerprint images comprises using a fingerprint platform to move the fingerprint relative to the detection surface of a detection array to produce the plurality of partial fingerprint images.

18. The method of claim 17, further including the step of tracking each position of the fingerprint platform as the fingerprint platform is moved relative to the detection surface of the detection array.

19. The method of claim 18, further including the step of mapping each position of the fingerprint platform to a corresponding specific physical location within a memory device.

20. The method of claim 19, further including the step of reflecting an individual partial fingerprint image onto the detection surface of the detection array at each position of the fingerprint platform.

21. The method of claim 20, further including the step of writing each individual partial fingerprint image associated with each mapped position of the fingerprint platform to the corresponding specific physical location within the memory device.

22. The method of claim 21, wherein the step of constructing a final fingerprint image constructs a final fingerprint image from the partial fingerprint images in the memory device.

23. The method of claim 17, further including the step of associating a platform pattern with the fingerprint platform, the platform pattern comprising a plurality of partial platform patterns, each partial fingerprint image of the plurality of partial fingerprint images being associated with an individual partial platform pattern.

24. The method of claim 23, further including the step of reflecting the partial fingerprint images and the associated partial platform patterns associated with each individual partial fingerprint onto the detection surface as the fingerprint is moved relative to the detection surface.

25. The method of claim 24, further including the step of mapping each partial platform pattern associated with the fingerprint platform to a corresponding to a specific physical location within a memory device.

26. The method of claim 25, further including the step of writing each individual partial fingerprint image associated with each partial platform pattern to the corresponding specific physical location within the memory device.

27. The method of claim 26, wherein the step of constructing a final fingerprint image constructs a final fingerprint image from the partial fingerprint images in the memory device.

28. A computer readable medium containing executable instructions which, when executed in a processing system, causes the processing system to perform the steps of a method for generating a fingerprint image, the method comprising:

supplying a plurality of partial fingerprint images of a fingerprint to a detection surface of a detection array as the fingerprint is moved relative to the detection surface; and constructing a final fingerprint image from the plurality of partial fingerprint images.

29. The computer readable medium of claim 28, wherein the step of constructing a final fingerprint image comprises:

tracking each position of a fingerprint platform relative to the detection surface; and constructing a final fingerprint image from plurality of partial fingerprint images supplied to the detection surface based upon the tracked movement of the fingerprint platform.

30. The computer readable medium of claim 28, wherein the step of supplying the plurality of partial fingerprint images comprises using a fingerprint platform to move the fingerprint relative to the detection surface of a detection array to produce the plurality of partial fingerprint images.

31. The computer readable medium of claim 30, wherein the method further includes the step of tracking each position of the fingerprint platform as the fingerprint platform is moved relative to the detection surface of the detection array.

32. The computer readable medium of claim 31, wherein the method further includes the step of mapping each position of the fingerprint platform to a corresponding specific physical location within a memory device.

33. The computer readable medium of claim 32, wherein the method further includes the step of reflecting an individual partial fingerprint image onto the detection surface of the detection array at each position of the fingerprint platform.

34. The computer readable medium of claim 33, wherein the method further includes the step of writing each individual partial fingerprint image associated with each mapped position of the fingerprint platform to the corresponding specific physical location within the memory device.

35. The computer readable medium of claim 34, wherein the step of constructing a final fingerprint image constructs a final fingerprint image from the partial fingerprint images in the memory device.

36. The computer readable medium of claim 30, wherein the method further includes the step of associating a platform pattern with the fingerprint platform, the platform pattern comprising a plurality of partial platform patterns, each partial fingerprint image of the plurality of partial fingerprint images being associated with an individual partial platform pattern.

37. The computer readable medium of claim 36, wherein the method further includes the step of reflecting the partial fingerprint images and the associated partial platform patterns associated with each individual partial fingerprint onto the detection surface as the fingerprint is moved relative to the detection surface.

38. The computer readable medium of claim 37, wherein the method further includes the step of mapping each partial platform pattern associated with the fingerprint platform to a corresponding to a specific physical location within a memory device.

39. The computer readable medium of claim 38, wherein the method further includes the step of writing each individual partial fingerprint image associated with each partial platform pattern to the corresponding specific physical location within the memory device.

40. The computer readable medium of claim 39, wherein the step of constructing a final fingerprint image constructs a final fingerprint image from the partial fingerprint images in the memory device.

* * * * *